(12) United States Patent
Cho et al.

(10) Patent No.: US 11,953,720 B2
(45) Date of Patent: Apr. 9, 2024

(54) SEMICONDUCTOR DEVICE, PHOTONIC CIRCUIT AND METHOD FOR ADJUSTING RESONANT WAVELENGTH OF OPTICAL MODULATOR

(71) Applicant: TAIWAN SEMICONDUCTOR MANUFACTURING COMPANY LTD., Hsinchu (TW)

(72) Inventors: Lan-Chou Cho, Hsinchu (TW); Chewn-Pu Jou, Hsinchu (TW); Cheng-Tse Tang, Hsinchu County (TW); Stefan Rusu, Sunnyvale, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/674,646

(22) Filed: Feb. 17, 2022

(65) Prior Publication Data
US 2023/0258860 A1  Aug. 17, 2023

(51) Int. Cl.
*G02B 6/12* (2006.01)
*G02F 1/025* (2006.01)

(52) U.S. Cl.
CPC ......... *G02B 6/12004* (2013.01); *G02F 1/025* (2013.01); *G02B 2006/12142* (2013.01)

(58) Field of Classification Search
CPC ...... G02B 6/12004; G02B 2006/12142; G02F 1/025
See application file for complete search history.

(56) References Cited

U.S. PATENT DOCUMENTS

2015/0316794 A1* 11/2015 Hayakawa ............ G02F 1/0121 385/2
2020/0145123 A1*  5/2020 Melikyan ............... G02F 1/011

FOREIGN PATENT DOCUMENTS

CN          112415663 A  *  2/2021  ......... G02B 6/29343

* cited by examiner

*Primary Examiner* — Sung H Pak
(74) *Attorney, Agent, or Firm* — WPAT Law; Anthony King

(57) ABSTRACT

The present disclosure provides a semiconductor device, a photonic circuit, and a method for adjusting a resonant wavelength of an optical modulator. The semiconductor device includes a substrate, a first waveguide disposed on the substrate, and a second waveguide disposed on the substrate and spaced apart from the first waveguide with a first distance. In addition, the second waveguide includes a first electrical coupling portion having a first type doping, a second electrical coupling portion having a second type doping, and an optical coupling portion disposed between the first electrical coupling portion and the second electrical coupling portion, wherein the second waveguide is configured to receive a first voltage through the first electrical coupling portion and the second electrical coupling portion to decrease a resonant wavelength of the second waveguide.

20 Claims, 18 Drawing Sheets

SEMICONDUCTOR DEVICE, PHOTONIC CIRCUIT AND METHOD FOR ADJUSTING RESONANT WAVELENGTH OF OPTICAL MODULATOR

BACKGROUND

Optical signaling and processing have become increasingly popular in recent years, particularly with the use of optical fiber-related applications for signal transmission. Accordingly, devices integrating optical components and electrical components are utilized in conversion of optical to electrical signals, and processing thereof. In the optical signaling field, optical modulators (for example, ring modulators or micro-ring modulators) are elements utilized for alleviation of process mismatch and calibration of the optical signals.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1A:
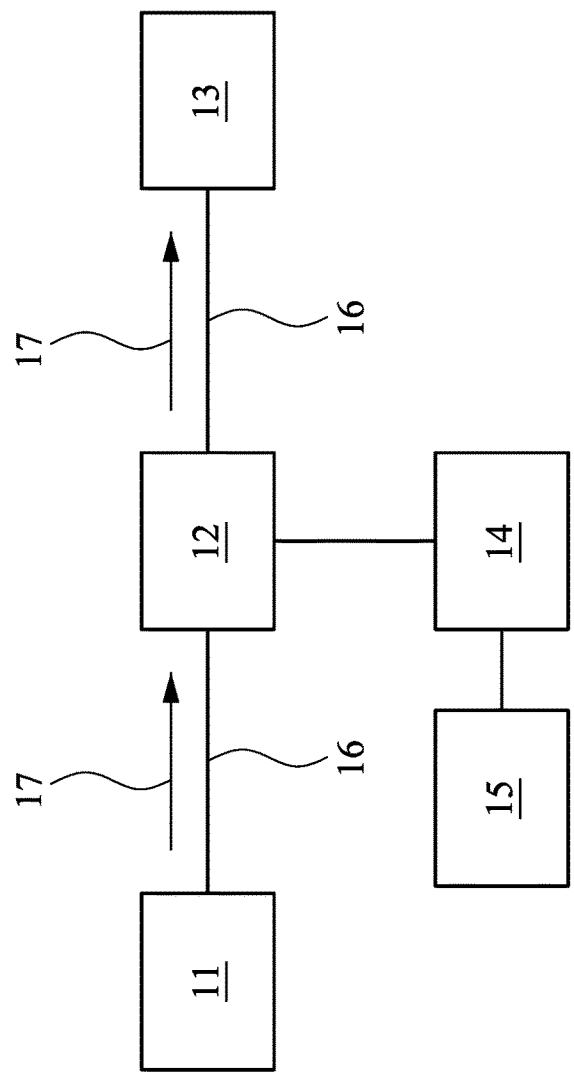
FIG. 1A is a block diagram of an optical communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1A is a block diagram of an optical communication system 10, in accordance with some embodiments. As shown in FIG. 1A, the optical communication system 10 includes an optical source 11, a modulator 12, a receiver 13, a driver 14, a processor 15 and waveguides 16. FIG. 1A also shows optical signals 17 transmitted within the optical communication system 10.

FIG. 1A illustrates how the optical source 11 may transmit a light signal to the modulator 12 with which the light signal 17 can be modulated and received by the receiver 13. The optical source 11, the modulator 12, and receiver 13 may be connected by the waveguides 16 (for example, optical fibers or optical conduits). In some embodiments, the optical source 11 may emit an optical signal 17. For example, the optical signal 17 can include laser beams and light beams. In some embodiments, the waveguides 16 may include optical fibers, optical waveguides, or optical conduits.

The optical communication system 10 may be part of the internal components of a computer system. For example, the processing system 10 may be part of, for example, a personal or laptop computer, with the modulator 12 included in a processor of the computer system and the receiver 13 included therein. The receiver 13 may be an internal card of the computer system such as a video controller card, a network interface card, memory or the like. In one embodiment, the optical communication system 10 may be included in a single chip or chipset with the optical source 11 and the receiver 13 being internal components of the chip or chipset. In another embodiment, the optical communication system 11 may be included in a communications network with optical source 11 and receiver 13 being included in separate components of the communications network.

As will be discussed in further detail, the modulator 12 may include a waveguide disposed between p-type semiconductor materials and n-type semiconductor materials. In particular embodiments, these patterns may form discrete shapes from a light input end to a light output end of the waveguide. In one embodiment, the modulator 12 can be an optical modulator. For example, the modulator 12 can be a ring modulator (RM).

In some embodiments, the driver 14 is electrically connected to the processor 15. The driver can be configured to drive the modulator 12. In some embodiments, the optical source 11 may include a light source (e.g., a VCSEL diode). In some embodiments, the receiver 13 may include an amplifier and a photo detector (not shown in FIG. 1A). During optical communication between the optical source 11 and the receiver 13, the processor 15 may generate and transmit an electrical signal to the driver 14. Meanwhile, the driver 14 can control the modulator 12 based on the electrical signal generated by the processor 15, such that the optical signal 17 is emitted from the optical source 11 through the waveguide 16 to the modulator 12. In addition, the optical signal 17 irradiated onto the modulator 12 can be modulated to generate an optical signal. The optical signal generated by the modulator 12 is transmitted to and received by the receiver 13 through the waveguide 16. Subsequently, the receiver 13 may convert the optical signal into a photo-current (another electrical signal) and the photo-current can be amplified by the amplifier. The amplified electrical signal can then be transmitted to other elements in the computer system.

Figure 1B:
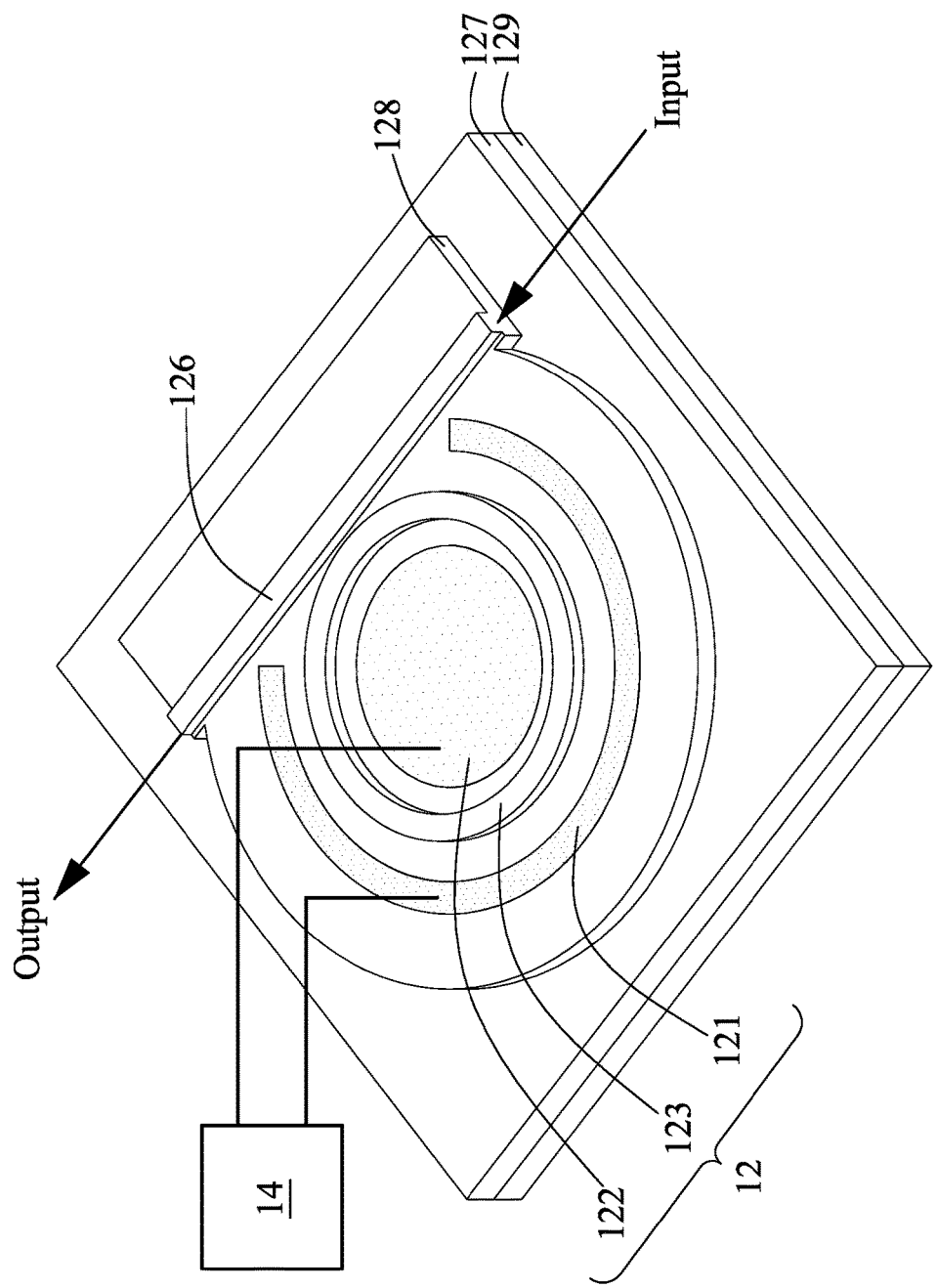
FIG. 1B is a schematic diagram of a semiconductor structure of a photonic device, in accordance with some embodiments.

FIG. 1B is a schematic diagram of a semiconductor structure 100 of a photonic device, in accordance with some embodiments. The semiconductor structure 100 can include a substrate 129, a dielectric layer 127, a semiconductor layer 128, a waveguide 126, a driver 14, and a modulator 12. In some embodiments, the modulator 12 can include optical coupling portion 123 and electrical coupling portions 121 and 122. FIG. 1B shows that the modulator 12 is coupled to the driver 14.

Referring to FIG. 1B, the semiconductor structure 100 includes the substrate 129. In some embodiments, the substrate 129 may be a silicon substrate, a silicon germanium substrate, or a substrate formed of other semiconductor materials. In some embodiments, the substrate 129 may be doped with p-type dopants (such as boron or BF2), n-type dopants (such as phosphorus or arsenic), or a combination thereof. Alternatively, the substrate 129 may be an intrinsic semiconductor substrate. In alternative embodiments, the substrate 129 is a dielectric substrate formed of, for example, silicon oxide.

The dielectric layer 127 can be disposed on the substrate 129. In some embodiments, a material of the dielectric layer 127 includes silicon oxide, silicon nitride, titanium oxide, or the like. In some embodiments, the dielectric layer 127 can constitute multiple dielectric layers.

The semiconductor layer 128 can be disposed on the dielectric layer 127. That is, the semiconductor layer 128 can be disposed on the substrate 129. In some embodiments, the dielectric layer 127 can be disposed between the semiconductor layer 128 and the substrate 129. In some embodiments, a material of the semiconductor layer 128 may be the same or different from that of the substrate 129. For example, the semiconductor layer 128 may be made of a suitable elemental semiconductor, such as crystalline silicon, diamond, or germanium, a suitable compound semiconductor, such as gallium arsenide, silicon carbide, indium arsenide, or indium phosphide, or a suitable alloy semiconductor, such as silicon germanium carbide, gallium arsenic phosphide, or gallium indium phosphide. In some embodiments, the semiconductor layer 128 can include the modulator 12 and the waveguide 126. As shown in FIG. 1B, the semiconductor layer 128 can be doped to form various regions, for example, the electrical coupling portions 121 and 122.

In some embodiments, the waveguide 126 can be disposed on the substrate 129. The waveguide 126 can be formed in the semiconductor layer 128. The waveguide 126 can have an input terminal and an output terminal. The input terminal of the waveguide 126 may be coupled to the optical source 11 as shown in FIG. 1A. In some embodiments, the output terminal of the waveguide 126 can be coupled to the receiver 13 shown in FIG. 1A. The optical signal (for example, the optical signal 17 as shown in FIG. 1A) generated by the optical source 11 can be received at the input terminal of the waveguide 126; transmitted through the waveguide 126; and then output at the output terminal of the waveguide 126.

The modulator 12 may include a waveguide. In some embodiments, the modulator 12 may include a curved waveguide. The modulator 12 can include the optical coupling portion 123 and the electrical coupling portions 121 and 122. In some embodiments, the modulator 12 may be disposed on the substrate 129 and adjacent to the waveguide 126. In some embodiments, the modulator 12 may be spaced apart from the waveguide 126 by a distance. The distance is small enough such that the optical signal in the waveguide 126 can be optically coupled to the modulator 12. In some embodiments, portions of the optical signal within a specific frequency/wavelength range in the waveguide 126 can be absorbed or refracted by the modulator 12, such that the optical signal can be modulated and output at the output terminal of the waveguide 126.

The optical coupling portion 123 of the modulator 12 can be annular or elliptical. In some embodiments, the optical coupling portion 123 can be spaced apart from the waveguide 126. In some embodiments, the optical coupling portion 123 can include a waveguide.

In some embodiments, the electrical coupling portions 121 and 122 may be formed in the semiconductor layer 128. The semiconductor layer 128 can be doped to form the electrical coupling portions 121 and 122. In some embodiments, the electrical coupling portions 121 and 122 are disposed on the substrate 129. The electrical coupling portions 121 and 122 can be disposed adjacent to the optical coupling portion 123. In some embodiments, the optical coupling portion 123 is disposed between the electrical coupling portions 121 and 122.

In some embodiments, the semiconductor material in the electrical coupling portion 121 may be doped with dopants of first conductivity type. Meanwhile, the semiconductor material in the electrical coupling portion 122 may be doped with dopants of second conductivity type. In some embodiments, the first conductivity type is opposite to the second conductivity type. For example, the dopants of first conductivity type may be p-type dopants and the dopants of the second conductivity type may be n-type dopants. That is, the semiconductor material in the electrical coupling portion 121 can be doped with p-type dopants while the semiconductor material in the electrical coupling portion 122 is doped with n-type dopants. Nevertheless, the electrical coupling portion 121 can also be n-type doped, and the electrical coupling portion 122 can be p-type doped. In some embodiments, the p-type dopants include, for example, boron, BF2, or the like. On the other hand, the n-type dopants include, for example, phosphorus, arsenic, or the like.

Referring to FIG. 1B, the driver 14 can be electrically coupled to the modulator 12. The driver 14 can apply a voltage to the electrical coupling portion 121. In some embodiments, the driver 14 can apply a voltage to the electrical coupling portion 122. That is, the modulator 12 can be configured to receive the voltage through the electrical coupling portions 121 and 122. With the applied voltage, a resonant wavelength or frequency of the modulator 12 can be adjusted to approach a predetermined value. A part of the optical signal in the waveguide 126 can be optically coupled to the modulator when the wavelength of the part of the optical signal is resonant with the modulator 12. Accordingly, the desired output optical signal at the output terminal of the waveguide 126 can be modulated by absorbing a part of the optical signal by the modulator 12.

Figure 2A:
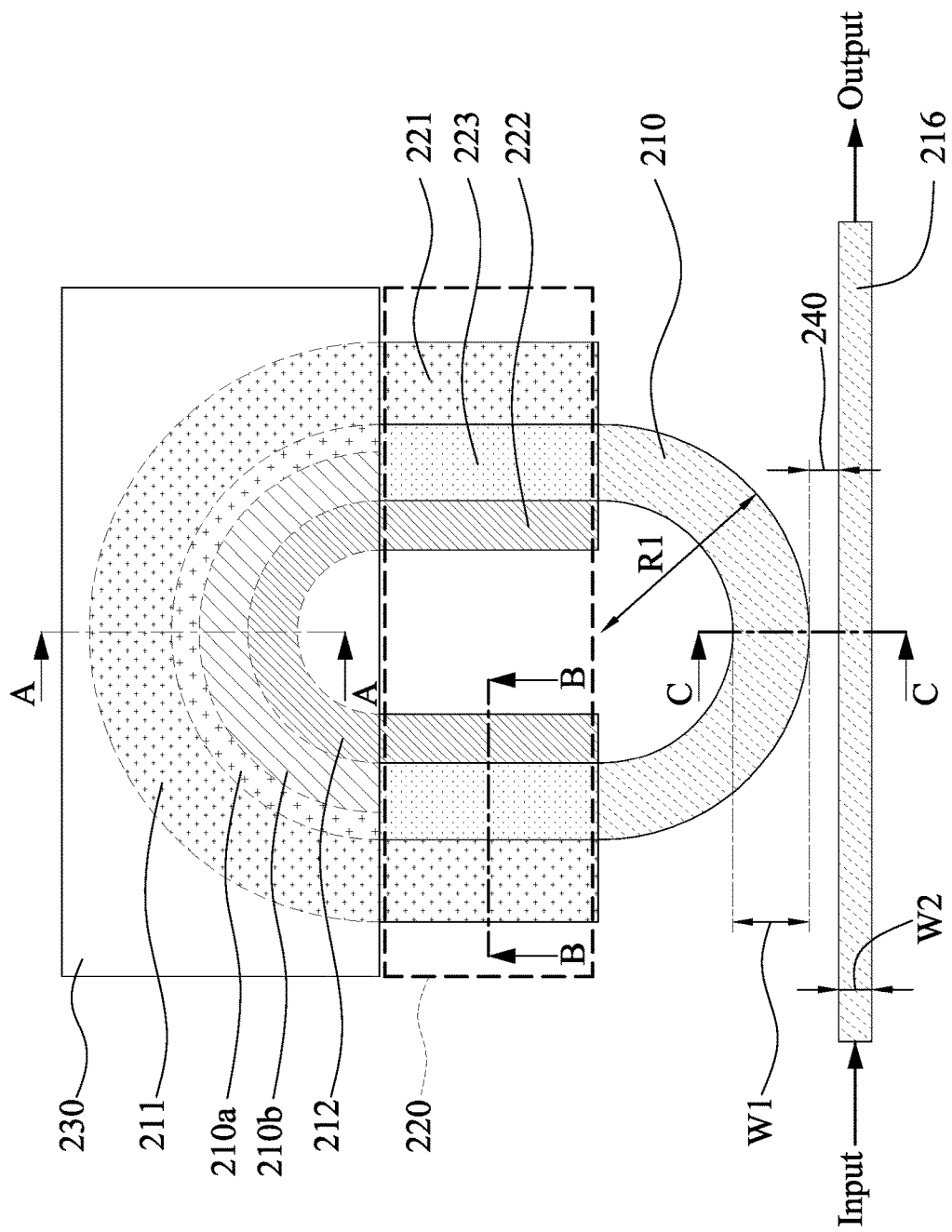
FIG. 2A is a top view of a photonic device, in accordance with some embodiments.

FIG. 2A is a top view of a photonic device, in accordance with some embodiments, including a modulator 12A and a waveguide 216. In some embodiments, the modulator 12A in FIG. 2A can correspond to the modulator 12 in FIG. 1B, and the waveguide 216 can correspond to the waveguide 126 in FIG. 1B. As shown in FIG. 2A, the modulator 12A can be spaced apart from the waveguide 216 by a distance 240. The distance 240 can be small enough to optically couple the optical signal in the waveguide 216 to the modulator 12A. The modulator 12A may include a waveguide (or optical coupling portion) 210, a low speed phase shifter portion 220, electrical coupling portions 211 and 212, and a heater 230. FIG. 2A includes section lines A-A, B-B, and C-C, while details of the cross-section along those section lines are presented in FIGS. 2B-2E.

Referring to FIG. 2A, the waveguide 216 can have an input terminal for receiving optical signal and an output terminal for transmitting the optical signal. In some embodiments, the waveguide 216 may be of a width W2. In some embodiments, the width W2 of the waveguide 216 may be in a range of 0.01 to 10 µm.

The modulator 12A includes at least an optical coupling portion (waveguide) 210. In some embodiments, the optical coupling portion 210 can be a curved waveguide. In some embodiments, the optical coupling portion 210 can be annular. In some embodiments, the waveguide 210 may be elliptical. The waveguide 210 may have a radius R1. As R1 increases, the free spectral range (FSR) of the modulator 12A can decrease. Therefore, the power for modulating the resonant of the modulator 12A can be reduced. In other words, the power consumption of the modulator 12A can be reduced as size of the modulator 12A increases.

In some embodiments, the waveguide 210 can be of a width W1. For example, the width W1 of the waveguide 210 may be in a range of 0.01 to 10 µm. In one embodiment, the width W1 of the waveguide 210 may exceed 1 µm. In some embodiments, the width W1 of the waveguide 210 may be in a range of 1 to 10 µm. The process sensitivity of the modulator 12A can decrease as the width W1 increases. In other words, the stability of the modulator 12A may be improved as width W1 increases.

The low speed phase shifter portion 220 in FIG. 2A can include electrical coupling portions 221 and 222, and optical coupling portion 223. In some embodiments, the optical coupling portion 223 is a part of the optical coupling portion 210, which may have different dopants doped therein. The electrical coupling portions 221 and 222 can be disposed adjacent to the optical coupling portion 223. In some embodiments, the optical coupling portion 223 is disposed between the electrical coupling portions 221 and 222.

In some embodiments, the semiconductor material in the electrical coupling portion 221 may be doped with dopants of a first conductivity type. The semiconductor material in the electrical coupling portion 222 may be doped with dopants of a second conductivity type. In some embodiments, the first conductivity type is different from the second conductivity type. For example, the dopants of first conductivity type may be p-type dopants, and the dopants of the second conductivity type may be n-type dopants. That is, the electrical coupling portion 221 can be a p-doped portion while the electrical coupling portion 222 can be an n-doped portion.

In some embodiments, the semiconductor material in the optical coupling portion 223 can be undoped or an intrinsic semiconductor. Accordingly, the low speed phase shifter portion 220 can include a PIN junction. With the PIN junction, the resonant wavelength (frequency) of the modulator 12A can be modulated. In some embodiments, the low speed phase shifter portion 220 can be the low speed PIN phase shifter (LSPIN) portion.

Referring to FIG. 2A, the modulator 12A may include a heater 230 disposed thereon. In some embodiments, the modulator 12A may include a dielectric layer (not shown in FIG. 2A) between the heater 230 and the optical coupling portion 210. In some embodiments, under the heater 230, electrical coupling portions 211 and 212, and regions 210a and 210b of the optical coupling portion 210 are provided.

The optical coupling portion 210 may include two regions 210a and 210b. The region 210a can be a part of the optical coupling portion 210, which may have different dopants doped therein. In some embodiments, the region 210b can be a part of the optical coupling portion 210, which may have different dopants doped therein. In some embodiments, the electrical coupling portions 211 can be disposed adjacent to the region 210a. That is, the region 210a may be disposed between the electrical coupling portion 211 and the region 210b. In some embodiments, the electrical coupling portion 210b can be disposed adjacent to the region 210b. That is, the region 210b may be disposed between the electrical coupling portion 212 and the region 210a.

In some embodiments, the semiconductor material in the region 210a may be doped with dopants of a conductivity type. The semiconductor material in the region 210b of the optical coupling portion 210 may be doped with dopants of a conductivity type, different from that of the region 210a of the optical coupling portion 210. For example, the semiconductor material in the region 210a of the optical coupling portion 210 can be doped with p-type dopants while the semiconductor material in the region 210b of the optical coupling portion 210 can be doped with n-type dopants.

The electrical coupling portions 211 and 212 are similar to the electrical coupling portions 221 and 222, respectively. That is, the electrical coupling portion 211 can be a p-doped portion while the electrical coupling portion 212 can be an n-doped portion.

In some embodiments, the heater 230 is disposed on the electrical coupling portions 211 and 212 and the regions 210a and 210b of the optical coupling portion. With the heater 230, the resonant wavelength (frequency) of the modulator 12A can be modulated.

Figure 2B:
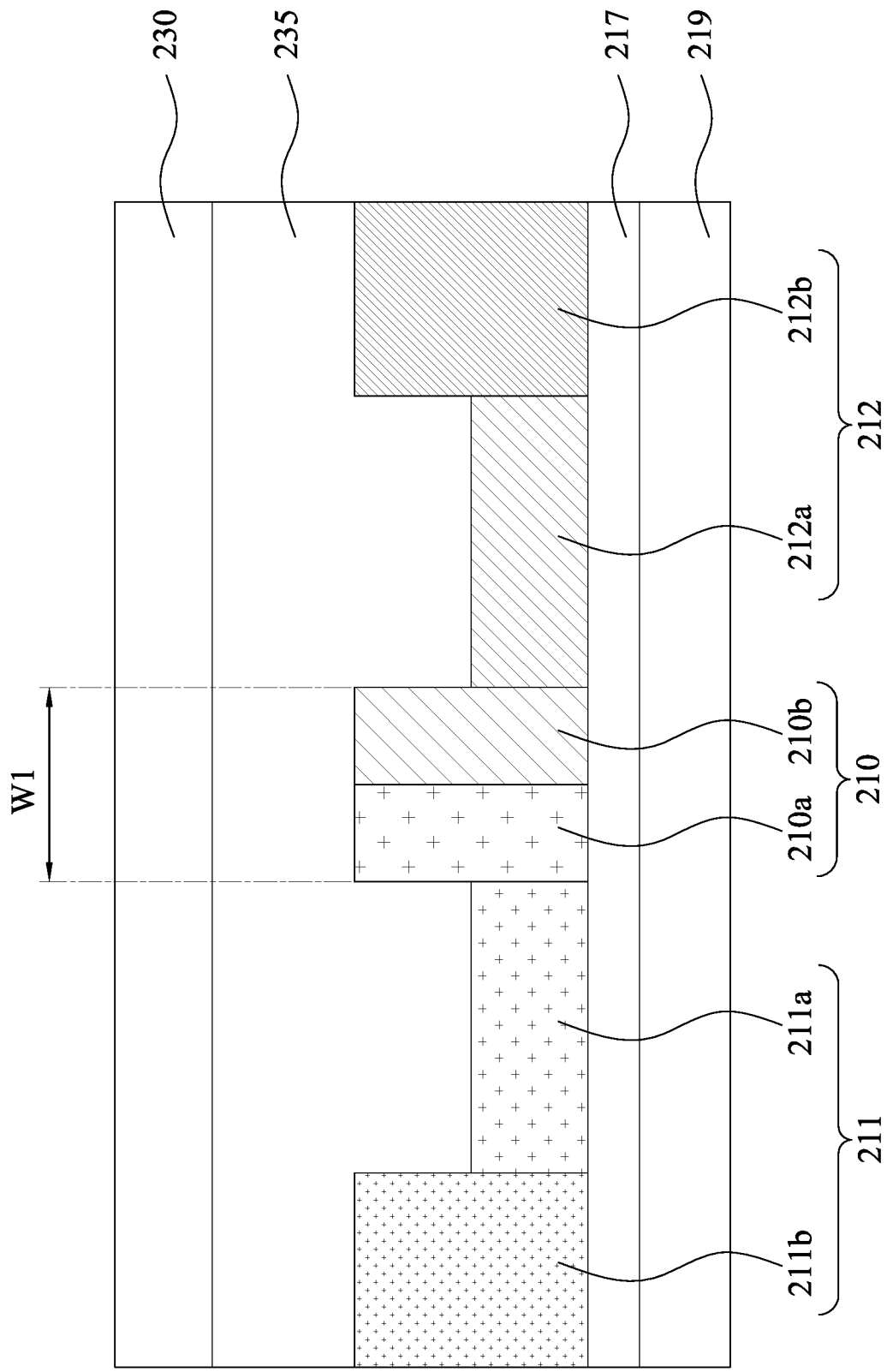
FIG. 2B is a cross-section of a photonic device along the section line A-A of FIG. 2A, in accordance with some embodiments.

FIG. 2B is a cross-section of the photonic device along the section line A-A in FIG. 2A. FIG. 2B includes a substrate 219, a dielectric layer 217, regions 210a and 210b of the optical coupling portion, regions 211a, 211b, 212a, and 212b of the electrical coupling portion, a dielectric layer 235, and a heater 230.

As shown in FIG. 2B, the dielectric layer 217 is disposed on the substrate 219. The substrate 219 is similar to the substrate 129 in FIG. 1B and the dielectric layer 217 is similar to the dielectric layer 127 in FIG. 1B, and thus detailed description thereof is omitted for brevity.

The optical coupling portion 210 can include two regions 210a and 210b. In one embodiment, the size of the region 210a can differ from that of the region 210b. In another embodiment, the size of the region 210a can be identical to that of the region 210b. For example, the width of the region 210a can be substantially identical to that of the region 210b. In some embodiments, the width of the region 210a can exceed that of the region 210b. The region 210a can be disposed on the substrate 219. In some embodiments, the dielectric layer 217 can be disposed between the region 210a and the substrate 219. The region 210b can be disposed on the substrate 219 and adjacent to the region 210a. In some embodiments, the dielectric layer 217 can be disposed between the region 210b and the substrate 219. In some embodiments, the regions 210a and 210b have a total width W1, which can correspond to the width W1 in FIG. 2A.

Referring to FIG. 2B, a dielectric layer 235 is disposed on the regions 210a and 210b of the optical coupling portion, and the regions 211a, 211b, 212a, and 212b of the electrical coupling portions. In some embodiments, the property and material of the dielectric layer 235 may be similar to the dielectric layer 217.

In some embodiments, the heater 230 can be disposed on the dielectric layer 235. The heater 230 can be a metal heater. For example, the heater 230 can generate heat induced by electrical current. The form and type of the heater 230 is not limited. In some embodiments, the heater 230 can be configured to modulate the resonant wavelength of the modulator 12A thermally. The heater 230 can provide heat to the modulator 12A, so that the temperature thereof can be increased. In some embodiments, the modulator 12A can have a temperature coefficient about 0.07 nm/° C. For example, if the resonant wavelength of the modulator is 1312 nm at 27° C., the thermally modulated resonant wavelength may be 1312.7 nm at 37° C. With the higher temperature, the resonant wavelength can be modulated at a nanometer level. In some embodiments, the resonant wavelength of the modulator 12A can be increased thermally as the temperature increases.

The electrical coupling portion 211 in FIG. 2A may include two regions 211a and 211b. In some embodiments, the region 211a can be disposed adjacent to the region 210a. The region 211b can be disposed adjacent to the region 211a of the electrical coupling portion. In some embodiments, the region 211a can be disposed between the region 211b and the region 210a. In one embodiment, the region 211b can be of a height different from that of the region 211a. For example, the height of the region 211b can exceed the height of the region 211a. The height of the regions of the electrical coupling portion 211 is not limited. For example, the height of the region 211b may be substantially identical to the height of the region 211a. In some embodiments, the region 211b may be connected to the driver 14 (as shown in FIG. 1B).

In some embodiments, the semiconductor material of the regions 211a and 211b can be the same conductivity type. For example, the regions 211a and 211b can be both doped with p-type dopants. In one embodiment, the region 211a can have a doping concentration identical to that of the region 211b. In another embodiment, the doping concentration of the region 211a can be different from that of the region 211b. For example, the doping concentration of the region 211b can exceed the doping concentration of the region 211a. In some embodiments, the electrical coupling portion 211 can include one or more regions. In other words, the electrical coupling portion 211 can include several regions having different doping concentration. In some embodiments, the doping concentration can decrease from the side of the electrical coupling portion 211 toward the optical coupling portion 210. In some embodiments, the doping concentration can decrease gradually from the electrical coupling portion 211 toward the optical coupling portion 210.

In some embodiments, the region 210a can be doped with dopants the same as in the regions 211a and 211b. In other words, the region 210a can be doped with p-type dopants. In some embodiments, the region 210a can have a doping concentration less than the doping concentration of the region 211b. In one embodiment, the region 210a can have a doping concentration substantially identical to that of the region 211a. In another embodiment, the doping concentration of the region 210a can be different from that of the region 211a. For example, the doping concentration of the region 210a can be less than that of the region 211a. The p-type doping concentration can decrease from the region 211b toward the region 210a.

The electrical coupling portion 212 in FIG. 2A may include two regions 212a and 212b. In some embodiments, the region 212a can be disposed adjacent to the region 210b. In some embodiments, the region 212a can be disposed between the region 212b and the region 210b. In one embodiment, the region 212b can be of a height different from that of the region 212a. For example, the height of the region 212b can exceed the height of the region 212a. The height of the regions of the electrical coupling portion 212 is not limited. For example, the height of the region 212b may be substantially identical to the height of the region 212a. In some embodiments, the region 212b may be connected to the driver 14 (as shown in FIG. 1B). With the region 211b and the region 212b connected to the driver 14, the electrical signal can be transmitted through the region 211*b*, 211*a*, 210*a*, 210*b*, 212*a*, and 212*b*. That is, there can be a conductive path through the region 211*b*, 211*a*, 210*a*, 210*b*, 212*a*, and 212*b*.

In some embodiments, the semiconductor material of the regions 212*a* and 212*b* can be the same conductivity type. For example, the regions 212*a* and 212*b* can be both doped with n-type dopants. In one embodiment, the region 212*a* can have a doping concentration identical to that of the region 212*b*. In another embodiment, the doping concentration of the region 212*a* can be different from that of the region 212*b*. For example, the doping concentration of the region 212*b* can exceed that of the region 212*a*. In some embodiments, the electrical coupling portion 212 can include one or more regions. In other words, the electrical coupling portion 212 can include several regions having different doping concentrations. In some embodiments, the doping concentration can decrease from the side of the electrical coupling portion 212 toward the optical coupling portion 210. In some embodiments, the doping concentration can decrease gradually from the electrical coupling portion 212 toward the optical coupling portion 210.

In some embodiments, the region 210*b* can be doped with dopants the same as in the regions 212*a* and 212*b*. In other words, the region 210*b* can be doped with n-type dopants. In some embodiments, the region 210*b* can have a doping concentration less than the doping concentration of the region 212*b*. In one embodiment, the region 210*b* can have a doping concentration substantially identical to that of the region 212*a*. In another embodiment, the doping concentration of the region 210*b* can be different from that of the region 212*a*. For example, the doping concentration of the region 210*b* can be less than that of the region 212*a*. The n-type doping concentration can decrease from the region 212*b* toward the region 210*b*.

The region 211*a* and 211*b* of the electrical coupling portion and the region 210*a* of the optical coupling portion can be p-type doped at different concentrations, while the region 212*a* and 212*b* of the electrical coupling portion and the region 210*b* of the optical coupling portion can be n-type doped at different concentrations. That is, the regions 211*a*, 211*b*, and 210*a* and the regions 212*a*, 212*b*, and 210*b* can form a P-N junction.

Figure 2C:
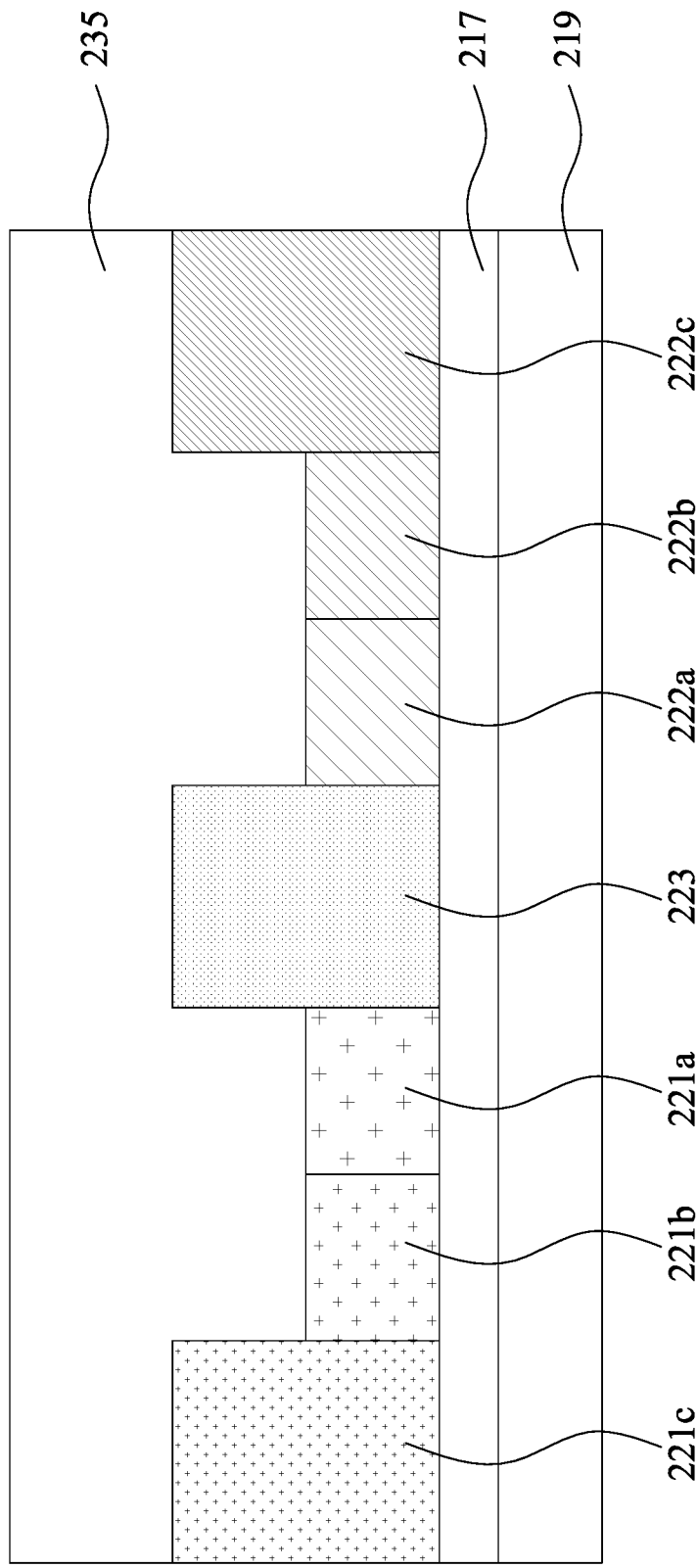
FIG. 2C is a cross-section of a photonic device along the section line B-B of FIG. 2A, in accordance with some embodiments.

FIG. 2C is a cross-section of the photonic device along the section line B-B in FIG. 2A, which is included in the low speed phase shifter portion 220. FIG. 2C includes a substrate 219, a dielectric layer 217, an optical coupling portion 223, regions 211*a*, 211*b*, 211*c*, 212*a*, 212*b*, and 212*c* of the electrical coupling portion, and a dielectric layer 235. Since the dielectric layer 217, the substrate 219 and the dielectric layer 235 are substantially same as those in FIG. 2B, detailed description thereof is omitted for brevity.

The optical coupling portion 223 can be disposed on the substrate 219. In some embodiments, the optical coupling portion 223 may be disposed between the substrate 219 and the dielectric layer 235. The optical coupling portion 223 in FIG. 2C is the same as in FIG. 2A, and thus detailed description is omitted herefrom. In some embodiments, the optical coupling portion 223 is a part of the optical coupling portion 210, which may have different dopants doped therein. That is, the width of the optical coupling portion 223 can be identical to that of the optical coupling portion 210 (i.e., the width W1).

The electrical coupling portion 221 in FIG. 2A may include three regions 221*a*, 221*b*, and 221*c*. In some embodiments, the region 221*a* can be disposed adjacent to the optical coupling portion 223. The region 221*b* can be disposed adjacent to the region 221*a* of the electrical coupling portion. In some embodiments, the region 221*a* can be disposed between the region 221*b* and the optical coupling portion 223. The region 221*c* can be disposed adjacent to the region 221*b* of the electrical coupling portion. In some embodiments, the region 221*b* can be disposed between the region 221*c* and the region 221*a*.

In one embodiment, the region 221*a* can be of a height identical to that of the region 221*b*. In some embodiments, the region 221*c* can be of a height different from that of the region 221*b*. For example, the height of the region 221*c* can exceed the height of the region 221*b*. The height of the regions of the electrical coupling portion 221 is not limited. For example, the height of the region 221*c* may be substantially identical to the height of the region 221*b*. In some embodiments, the region 221*c* may be connected to the driver 14 (as shown in FIG. 1B).

In some embodiments, the semiconductor material of the regions 221*a*, 221*b*, and 221*c* can be the same conductivity type. For example, the regions 221*a*, 221*b*, and 221*c* can be doped with p-type dopants. In one embodiment, the region 221*a* can have a doping concentration identical to that of the region 221*b*. In another embodiment, the doping concentration of the region 221*a* can be different from that of the region 221*b*. For example, the doping concentration of the region 221*b* can exceed the doping concentration of the region 221*a*. In one embodiment, the region 221*c* can have a doping concentration identical to that of the region 221*b*. In another embodiment, the doping concentration of the region 221*c* can be different from that of the region 221*b*. For example, the doping concentration of the region 221*c* can exceed the doping concentration of the region 221*b*. In some embodiments, the electrical coupling portion 221 can include one or more regions. In other words, the electrical coupling portion 221 can include several regions having different doping concentrations. In some embodiments, the doping concentration can decrease from the side of the electrical coupling portion 221 toward the optical coupling portion 223.

The electrical coupling portion 222 in FIG. 2A may include three regions 222*a*, 222*b*, and 222*c*. In some embodiments, the region 222*a* can be disposed adjacent to the optical coupling portion 223. The region 222*b* can be disposed adjacent to the region 222*a* of the electrical coupling portion. In some embodiments, the region 222*a* can be disposed between the region 222*b* and the optical coupling portion 223. The region 222*c* can be disposed adjacent to the region 222*b* of the electrical coupling portion. In some embodiments, the region 222*b* can be disposed between the region 222*c* and the region 222*a*.

In one embodiment, the region 222*a* can be of a height identical to that of the region 222*b*. In some embodiment, the region 222*c* can be of a height different from that of the region 222*b*. For example, the height of the region 222*c* can exceed the height of the region 222*b*. The height of the regions of the electrical coupling portion 222 is not limited. For example, the height of the region 222*c* may be substantially identical to the height of the region 222*b*. In some embodiments, the region 222*c* may be connected to the driver 14 (as shown in FIG. 1B).

The optical coupling portion 223 can be of a height identical to the regions 221*c* and 222*c*. In some embodiments, the height of the optical coupling portion 223 can be identical to that of the region 221*a*. In some embodiments, the height of the optical coupling portion 223 can be identical to that of the region 221*b*. In another embodiment, the height of the optical coupling portion 223 can be different from that of the region 221*a* and 221*b*. For example, the height of the optical coupling portion 223 can exceed that of the region 221a and 221b.

The optical coupling portion 223 can be of a width different from the width of the region 221a, 221b, 221c, 222a, 222b, and 222c. In one embodiment, the width of the optical coupling portion 223 can be less than the width of the region 221a. In another embodiment, the width of the optical coupling portion 223 can exceed the width of the region 221a. In some embodiments, the width of the optical coupling portion 223 can exceed a total width of the regions 221a, 221b, and 221c. Similarly, the width of the optical coupling portion 223 can exceed a total width of the regions 222a, 222b, and 222c.

In some embodiments, the semiconductor material of the regions 222a, 222b, and 222c can be the same conductivity type. For example, the regions 222a, 222b, and 222c can be doped with n-type dopants. In one embodiment, the region 222a can have a doping concentration identical to that of the region 222b. In another embodiment, the doping concentration of the region 222a can be different from that of the region 222b. For example, the doping concentration of the region 222b can exceed the doping concentration of the region 222a. In one embodiment, the region 222c can have a doping concentration identical to that of the region 222b. In another embodiment, the doping concentration of the region 222c can be different from that of the region 222b. For example, the doping concentration of the region 222c can exceed the doping concentration of the region 222b. The electrical coupling portion 222 may include one or more regions. In some embodiments, the electrical coupling portion 222 can include several regions having different doping concentrations. In some embodiments, the doping concentration can decrease from the side of the electrical coupling portion 222 toward the optical coupling portion 223.

With the region 221c and the region 222c connected to the driver 14, the electrical signal can be transmitted through the regions 221c, 221b, 221a, the optical coupling portion 223, and the regions 222a, 222b, and 222c. That is, there can be a conductive path through the regions 221c, 221b, 221a, the optical coupling portion 223, and the regions 222a, 222b, and 222c.

In some embodiments, the semiconductor material in the optical coupling portion 223 can be undoped or an intrinsic semiconductor. The region 221a, 221b, and 221c of the electrical coupling portion can be p-type doped at different concentrations, while the region 222a, 222b, and 222c of the electrical coupling portion can be n-type doped at different concentrations. That is, the p-type regions 221a, 221b, and 221c, the intrinsic (I) region 223, and the n-type regions 222a, 222b, and 222c can form a PIN junction. Accordingly, the low speed phase shifter portion 220 can include a PIN junction. With the PIN junction, the resonant wavelength (frequency) of the modulator 12A can be modulated. In some embodiments, the resonant wavelength of the modulator 12A can decrease with the higher voltage applied on such PIN junction. The modulator 12A may be configured to receive a voltage through the region 221c, 221b, 221a, the optical coupling portion 223, and the regions 222a, 222b, and 222c to decrease the resonant wavelength of the modulator 12A.

In some embodiments, the p-type regions 221a, 221b, and 221c may be symmetrical to the n-type regions 222a, 222b, and 222c along the optical coupling portion 223. In some embodiments, the size of the p-type regions 221a, 221b, and 221c can be different from that of the n-type regions 222a, 222b, and 222c. For example, the total width of the p-type regions 221a, 221b, and 221c can exceed that of the n-type regions 222a, 222b, and 222c.

Figure 2D:
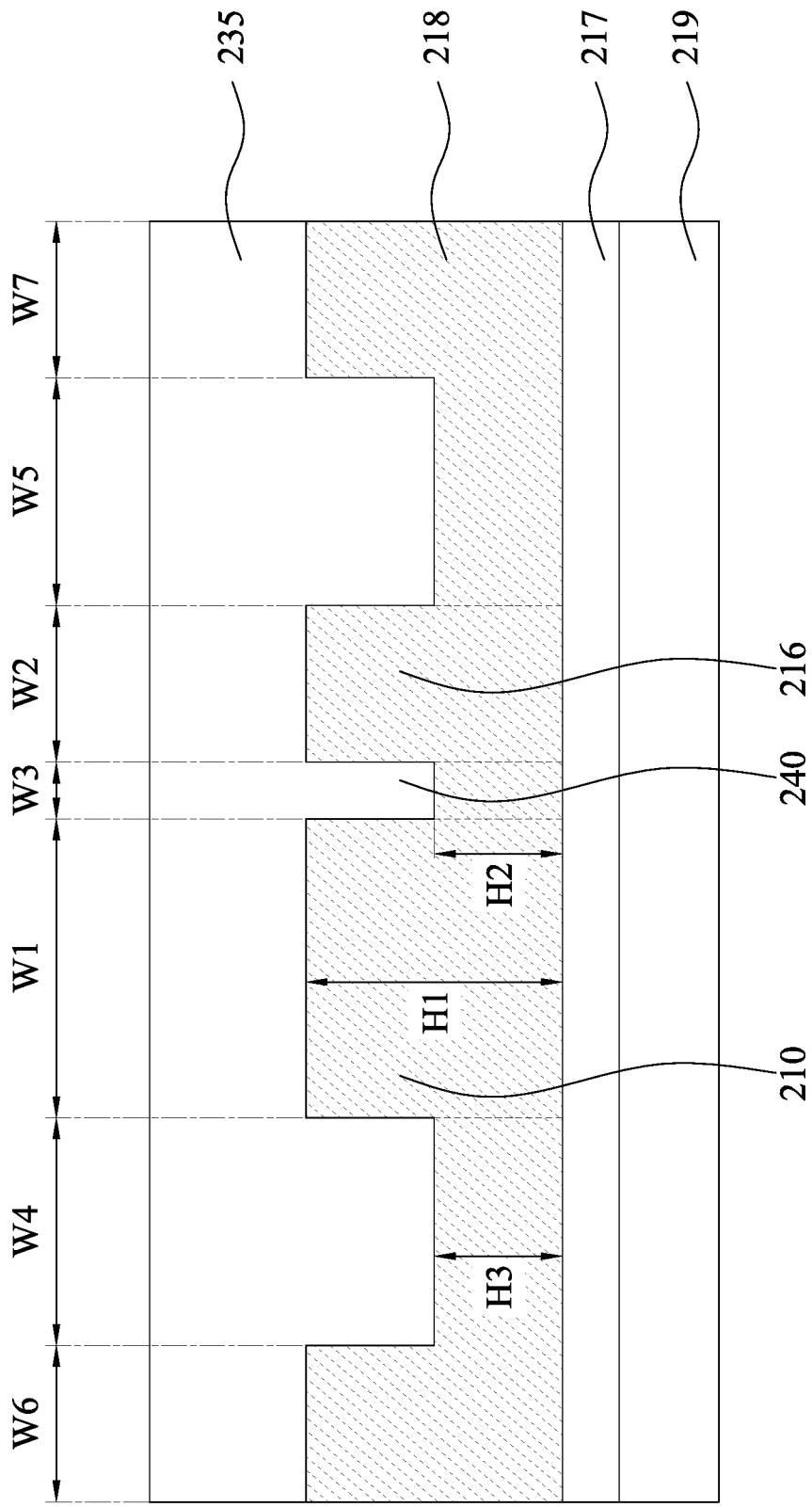
FIG. 2D is a cross-section of a photonic device along the section line C-C of FIG. 2A, in accordance with some embodiments.

FIG. 2D is a cross-section of a photonic device, in accordance with some embodiments. FIG. 2D shows the cross-section of the photonic device along the section line C-C in FIG. 2A. FIG. 2D includes a substrate 219, a dielectric layer 217, a semiconductor layer 218, an optical coupling portion 210, the waveguide 216, and a dielectric layer 235. Since the dielectric layer 217, the substrate 219 and the dielectric layer 235 are substantially same as those in FIG. 2B, detailed description thereof is omitted for brevity.

The optical coupling portion 210 can be disposed on the substrate 219. In some embodiments, the optical coupling portion 210 may be disposed between the substrate 219 and the dielectric layer 235. The optical coupling portion 210 in FIG. 2D is the same as that of FIG. 2A, and thus detailed description is omitted herefrom. In some embodiments, the optical coupling portion 210 can be formed in the semiconductor layer 218. The semiconductor layer 218 in FIG. 2D is similar to the semiconductor layer 128 in FIG. 1B, and thus detailed description is omitted herefrom. In some embodiments, the optical coupling portion 210 can be of a width W1 and a height H1. In some embodiments, the width W1 can be in a range of 0.01 to 10 μm. In another embodiment, the width W1 can exceed 1 μm. For example, the width W1 can be in a range of 1 to 10 μm. In some embodiments, the height H1 can exceed 0.01 μm. For example, the height H1 can be in a range of 0.01 to 10 μm.

The waveguide 216 can be formed in the semiconductor layer 218. In some embodiments, the waveguide 216 can be disposed on the substrate 219. The waveguide 216 may be disposed between the substrate 219 and the dielectric layer 235. The waveguide 216 in FIG. 2D is the same as that of FIG. 2A, and thus detailed description is omitted herefrom. The waveguide 216 can be of a width W2. In one embodiment, the width W2 of the waveguide 216 can be different from the width W1 of the optical coupling portion 210. In another embodiment, the width W2 can be identical to the width W1. In some embodiments, the width W2 can be in a range of 0.01 to 10 μm. In some embodiments, the waveguide 216 can have a height substantially identical to that of the optical coupling portion 210. In another embodiment, the height of the waveguide 216 can be different from that of the optical coupling portion 210.

The waveguide 216 can be spaced apart from the optical coupling portion 210 by the distance 240 having a width W3. In one embodiment, the width W3 can be identical to the width W1. In another embodiment, the width W3 can be different from the width W1. For example, the width W3 can be less than the width W1. In some embodiments, the width W3 can be less than the width W2. In some embodiments, the width W3 can be in a range of 0.01 to 10 μm.

In some embodiments, the waveguide 216 is disposed apart from the optical coupling portion with a gap of distance 240. In some embodiments, the part of the semiconductor 218 under the gap can have a height H2. The height H2 can be less than the height H1. In some embodiments, the height H2 can be in a range of 0 to 10 μm. That is, there may be no semiconductor layer between the waveguide 216 and the optical coupling portion 210.

The semiconductor layer 218 may have a structure similar to the electrical coupling portions 221 and 222. In some embodiments, the semiconductor layer 218 can have a slab region having a width W4 and a rib region having a width W6 in left side of the optical coupling portion 210. The slab region with width W4 can have a height H3. In some embodiments, the width W4 can be in a range of 0.01 to 10 µm. In some embodiments, the width W6 can be in a range of 0 to 10 µm. That is, the rib region may be optional. In some embodiments, the height H3 of the slab region can be in a range of 0 to 10 µm. That is, there may be no semiconductor layer adjacent to the left side of the optical coupling portion 210.

Similarly, the semiconductor layer 218 can have a slab region having a width W5 and a rib region having a width W7 in right side of the optical coupling portion 210. The slab region with width W5 can also have a height substantially identical to the height H3. In some embodiments, the width W5 can be in a range of 0.01 to 10 µm. In some embodiments, the width W7 can be in a range of 0 to 10 µm. That is, the rib region may be optional. In some embodiments, sine the height H3 of the slab region can be in a range of 0 to 10 µm, there may be no semiconductor layer adjacent to the right side of the optical coupling portion 210.

Figure 2E:
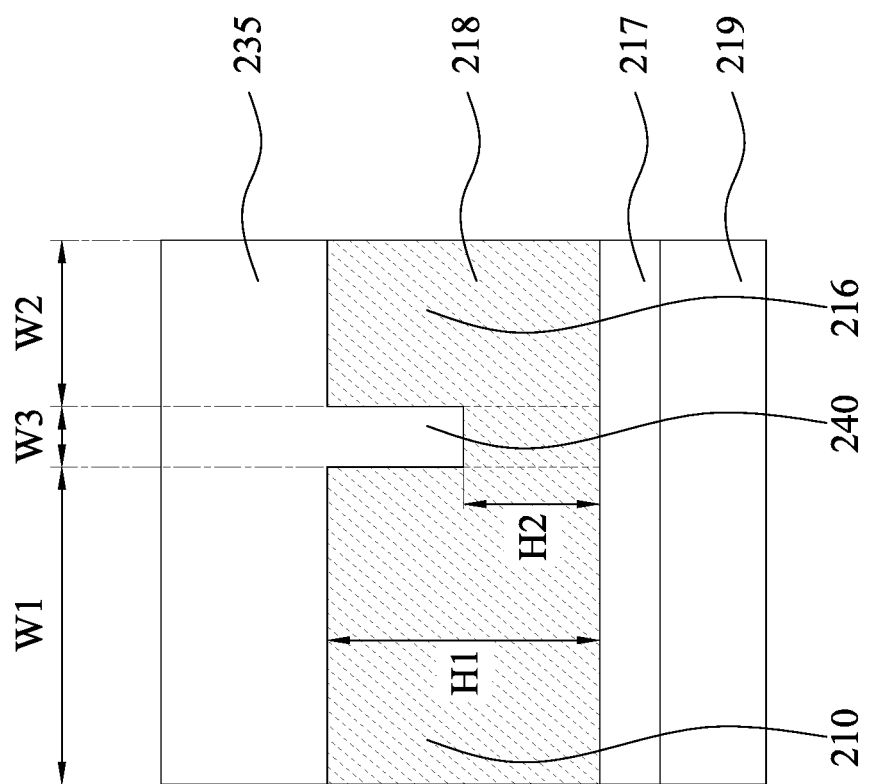
FIG. 2E is a cross-section of a photonic device along the section line C-C of FIG. 2A, in accordance with some embodiments.

FIG. 2E is a cross-section of a photonic device, in accordance with some embodiments. FIG. 2E is a cross-section of the photonic device along the section line C-C in FIG. 2A.

Referring to FIG. 2E, the cross-section along the section line C-C is similar to that in FIG. 2D, differing therefrom in that in FIG. 2E, the semiconductor layer 218 may not include the rib region and the slab region beside the optical coupling portion 210 and the waveguide 216. That is, the widths W6 and W7 can be zero and the height H3 can be zero, and thus no rib regions and slab region would exist in the semiconductor layer 218.

Figure 3A:
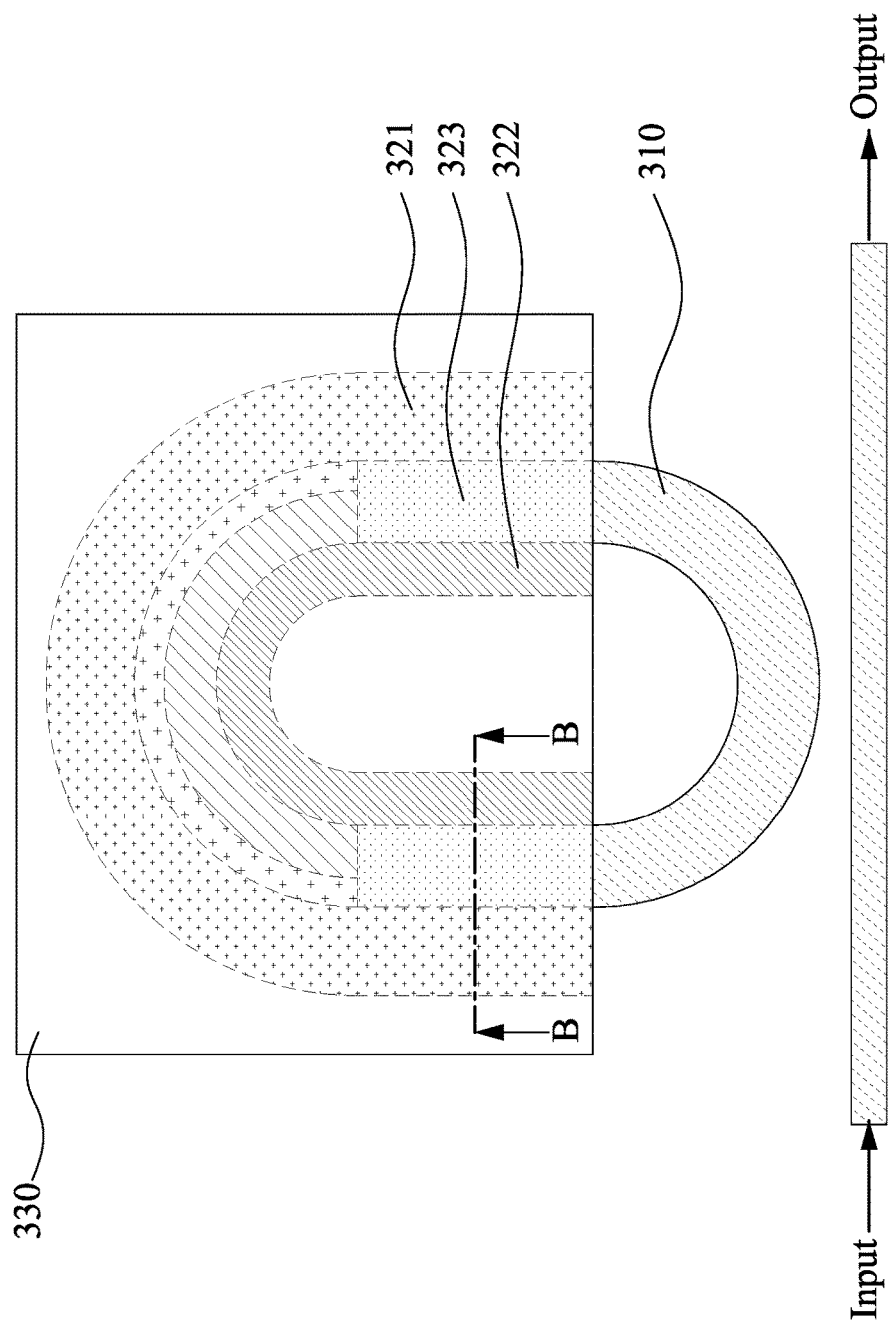
FIG. 3A is a top view of a photonic device, in accordance with some embodiments.

FIG. 3A is a top view of a photonic device, in accordance with some embodiments, in which the modulator 12B is similar to the modulator 12A in FIG. 2A, differing therefrom in that in FIG. 3A, the modulator 12B can have a heater 330 covering a greater area of the modulator 12B. The modulator 12B can include a waveguide (or optical coupling portion) 310, electrical coupling portions 321 and 322, an optical coupling portion 323 and a heater 330. FIG. 3A includes a section line B-B, while details of the cross-section along the section line B-B are presented in FIG. 3B.

In some embodiments, the heater 330 can cover a portion of the modulator 12B from a top view perspective. In another embodiment, the heater 330 may cover all of modulator 12B.

Figure 3B:
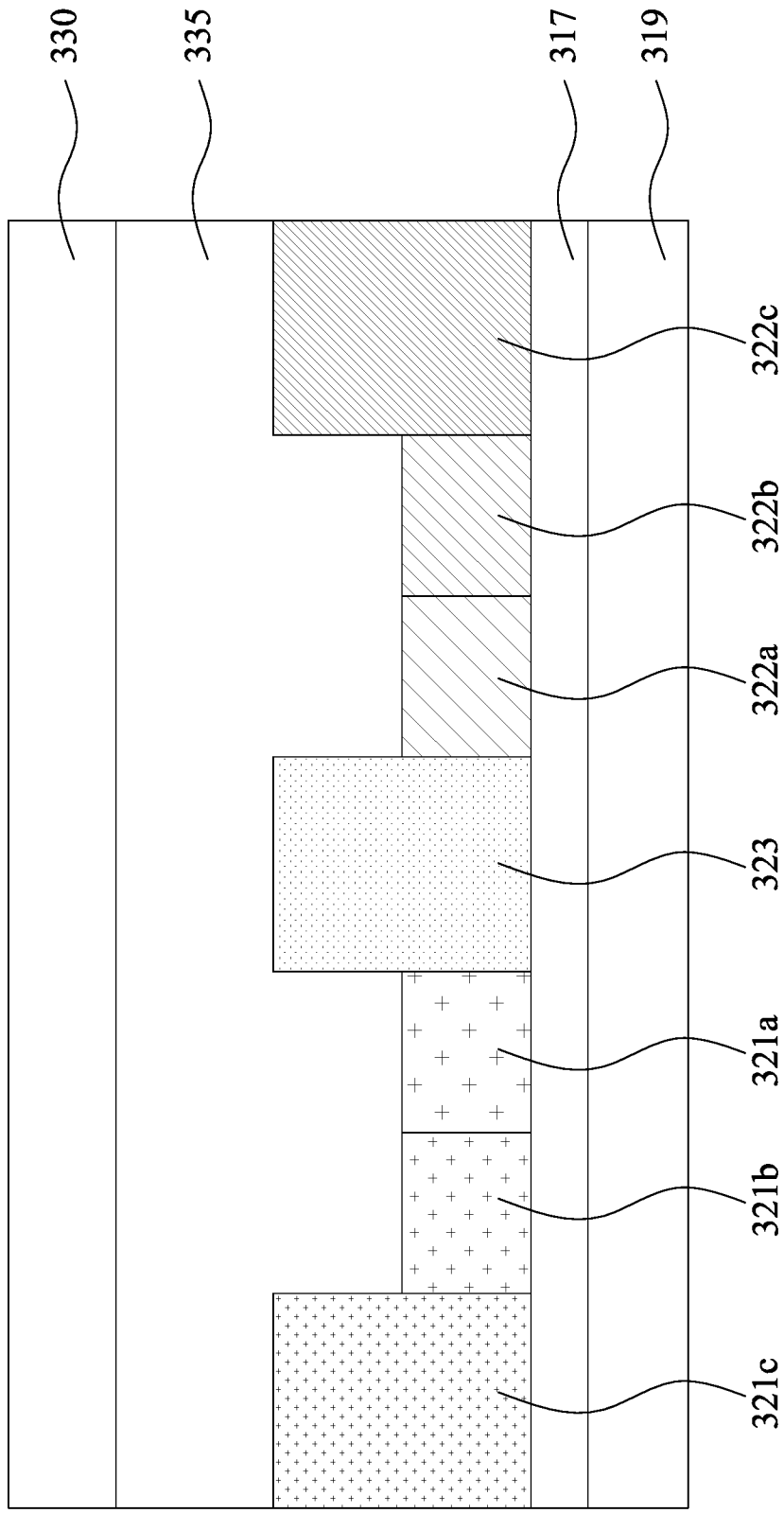
FIG. 3B is a cross-section of a photonic device along the section line B-B of FIG. 3A, in accordance with some embodiments.

FIG. 3B is a cross-section of a photonic device, in accordance with some embodiments. FIG. 3B is a cross-section of the photonic device along the section line B-B in FIG. 3A.

Referring to FIG. 3B, the cross-section along the section line B-B is similar to that in FIG. 2C, differing therefrom in that in FIG. 3B, the heater 330 is disposed on the low speed phase shifter portion. FIG. 3B includes a substrate 319, a dielectric layer 317, an optical coupling portion 323, regions 321a, 321b, and 321c of the electrical coupling portion 321, the regions 322a, 322b, and 322c of the electrical coupling portion 322, a dielectric layer 335, and the heater 330. Since the dielectric layer 317, the substrate 319, the regions 321a, 321b, and 321c of the electrical coupling portion 321, the optical coupling portion 323, the regions 322a, 322b, and 322c of the electrical coupling portion 322, and the dielectric layer 335 are substantially same as the dielectric layer 217, the substrate 219, the regions 221a, 221b, and 221c of the electrical coupling portion 221, the optical coupling portion 223, the regions 222a, 222b, and 222c of the electrical coupling portion 222, and the dielectric layer 235 in FIG. 2C, detailed description thereof is omitted for brevity.

As shown in FIG. 3B, the heater 330 can be disposed on the regions 321a, 321b, and 321c of the electrical coupling portion 321, the optical coupling portion 323, and the regions 322a, 322b, and 322c of the electrical coupling portion 322. Therefore, the heater 330 and the low speed phase shifter can be configured to receive electrical signal or voltage to modulate the resonant wavelength of the modulator 12B.

Figure 4A:
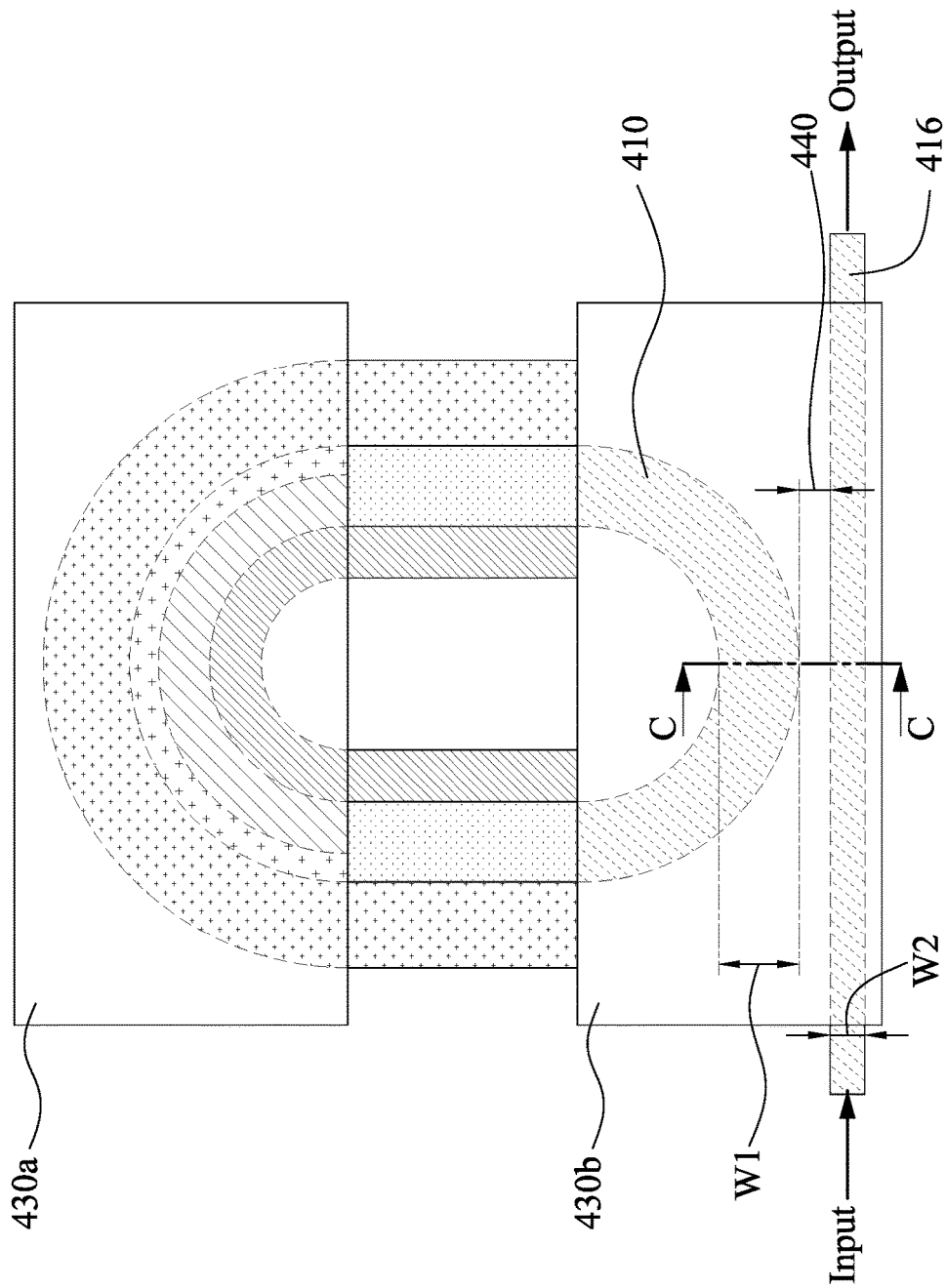
FIG. 4A is a top view of a photonic device, in accordance with some embodiments.

FIG. 4A is a top view of a photonic device, in accordance with some embodiments, in which the modulator 12C is similar to the modulator 12A in FIG. 2A, differing therefrom in that in FIG. 4A, the modulator 12C can have heaters 430a and 430b covering different portions of the modulator 12C. The modulator 12C can include a waveguide (or optical coupling portion) 410, and heaters 430a and 430b. FIG. 4A includes a section line C-C, while details of the cross-section along the section line C-C are presented in FIG. 4B.

In some embodiments, the heater 430a can be identical to the heater 230 in FIG. 2A. In some embodiments, the heater 430b can cover a portion of the modulator 12C different from the portion covered by the heater 430a from the top view perspective. In one embodiment, the heater 430a can overlap with the heater 430b. In another embodiment, the heater 430b can be spaced apart from the heater 430a. For example, the heater 430b can cover the part of the optical coupling portion 410 that may not doped with any dopants. In some embodiments, the heater 430b can cover a part of the waveguide 416.

Figure 4B:
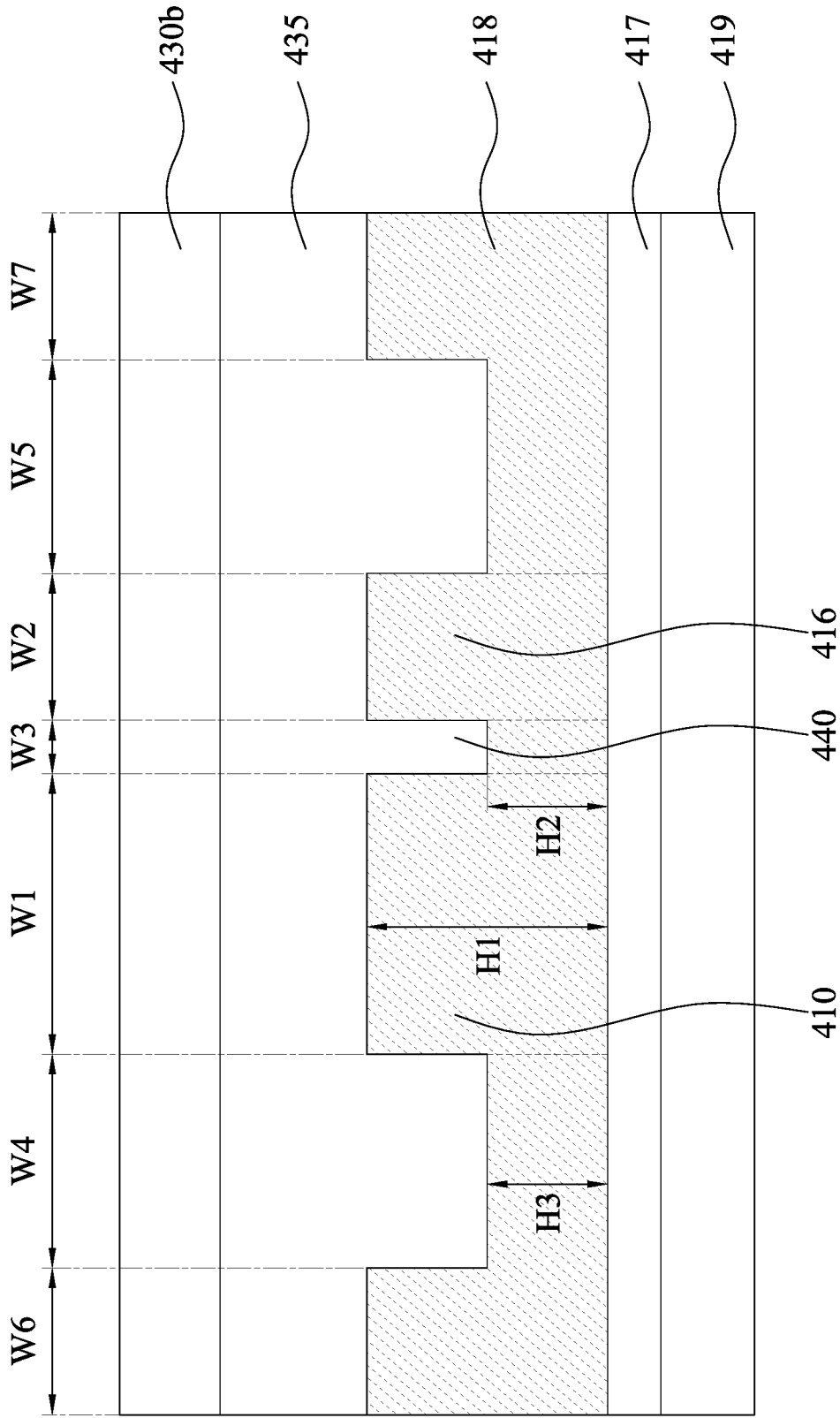
FIG. 4B is a cross-section of a photonic device along the section line C-C of FIG. 4A, in accordance with some embodiments.

FIG. 4B is a cross-section of the photonic device along the section line C-C in FIG. 4A, similar to that in FIG. 2D, differing therefrom in that in FIG. 4B, the heater 430b is disposed on the waveguide 416 and the optical coupling portion 410. FIG. 4B includes a substrate 419, a dielectric layer 417, a semiconductor layer 418, an optical coupling portion 410, the waveguide 416, a dielectric layer 435, and the heater 430b. Since the dielectric layer 417, the substrate 419, the semiconductor 418, the optical coupling portion 410, the waveguide 416, and the dielectric layer 435 are substantially same as the dielectric layer 217, the substrate 219, the semiconductor 218, the optical coupling portion 210, the waveguide 216, and the dielectric layer 235 in FIG. 2D, detailed description thereof is omitted for brevity.

As shown in FIG. 4B, the heater 430b can be disposed on the optical coupling portion 410 and the waveguide 416. The waveguide 416 can be spaced apart from the optical coupling portion 410 in a distance 440. The different arrangement of the heater can provide flexible modulator design according to needs.

Figure 5A:
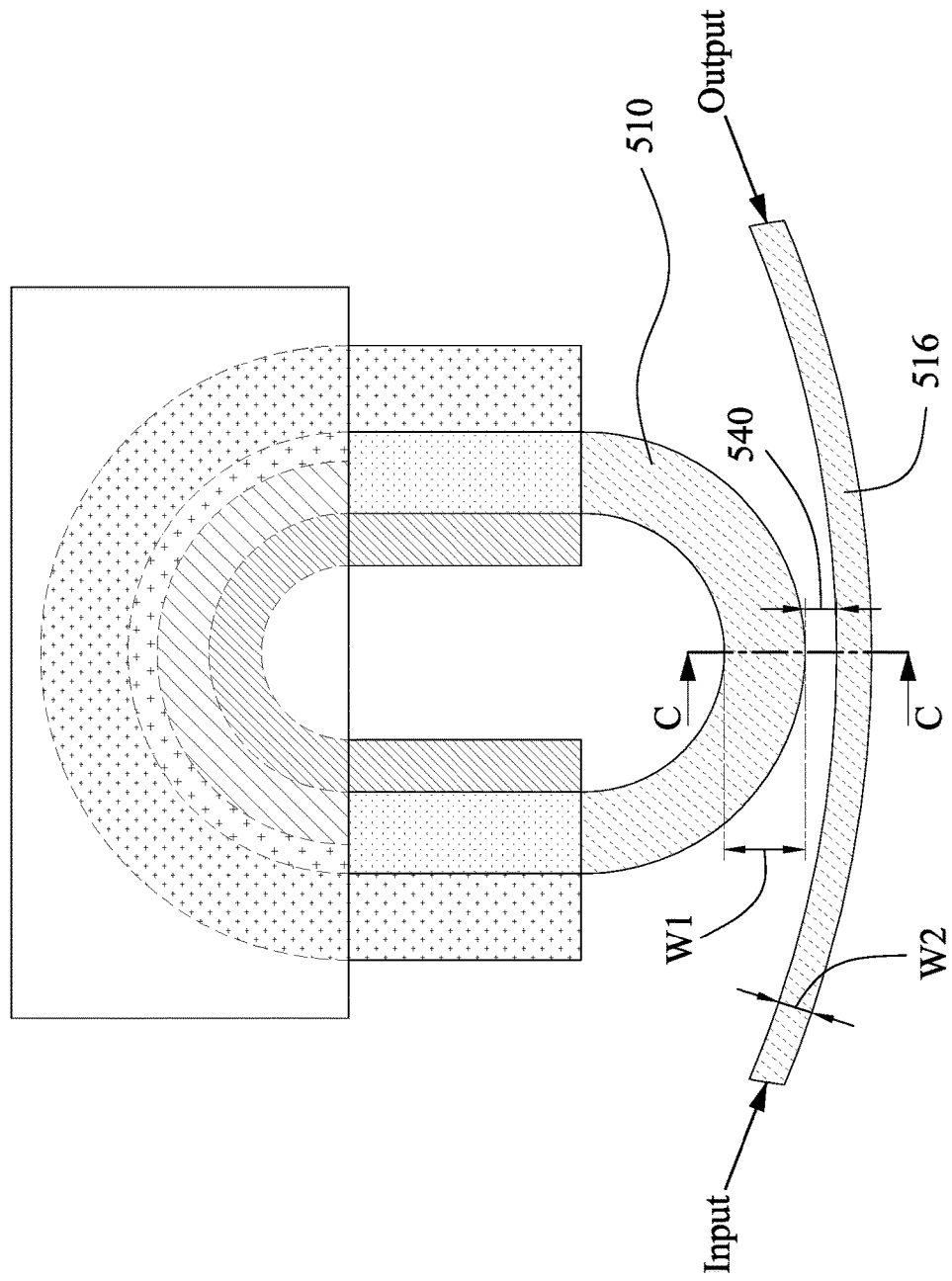
FIG. 5A is a top view of a photonic device, in accordance with some embodiments.

Referring to FIG. 5A, the modulator 12D is similar to the modulator 12A in FIG. 2A, differing therefrom in that in FIG. 5A, the waveguide 516 may be curved. The modulator 12D can include a waveguide (or optical coupling portion) 510, and the waveguide 516 disposed apart from the waveguide 510 by a distance 540. FIG. 5A includes a section line C-C, while details of the cross-section along the section line C-C are presented in FIG. 5B.

In some embodiments, the waveguide 516 may be concave with respect to the waveguide 510. Therefore, the waveguide 516 may have a curvature substantially conforming to a portion of the waveguide 510. In that case, the optical coupling area between the waveguide 510 and the waveguide 516 may be increased. Accordingly, the stability of the modulator 12D can be improved.

Figure 5B:
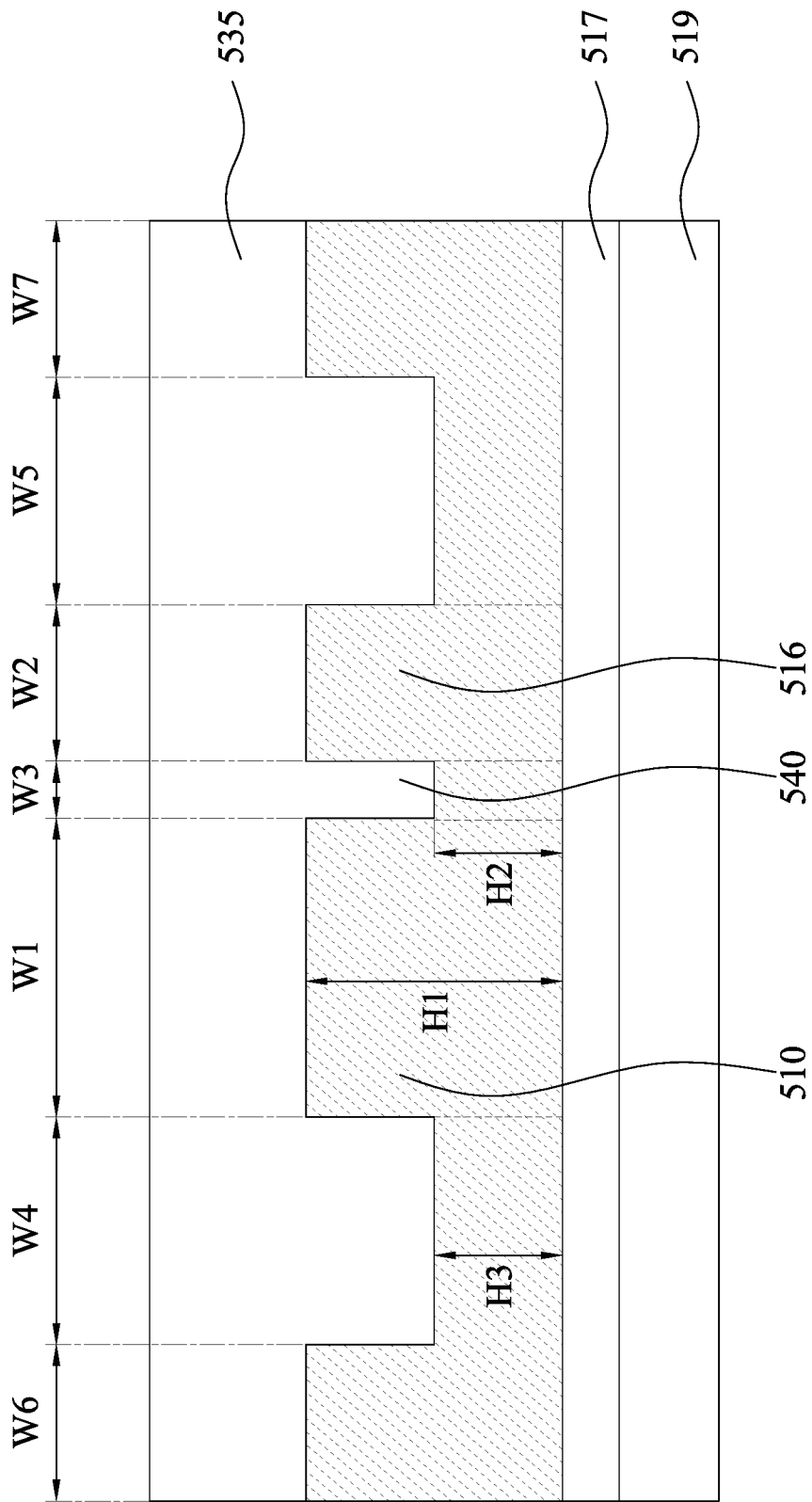
FIG. 5B is a cross-section of a photonic device along the section line C-C of FIG. 5A, in accordance with some embodiments.

FIG. 5B is a cross-section of the photonic device along the section line C-C in FIG. 5A, substantially identical to that in FIG. 2D, although the waveguide 516 is curved in the top view perspective.

Figure 5C:
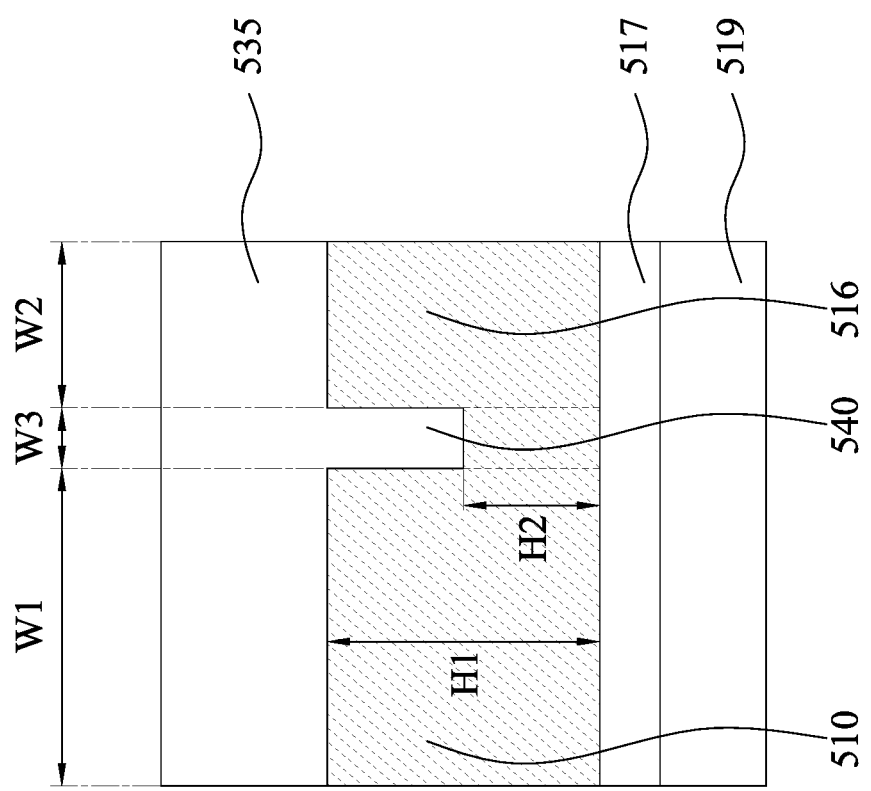
FIG. 5C is a cross-section of a photonic device along the section line C-C of FIG. 5A, in accordance with some embodiments.

FIG. 5C is a cross-section of the photonic device along the section line C-C in FIG. 5A, substantially identical to that in FIG. 2E, although the waveguide 516 is curved in the top view perspective.

Figure 6A:
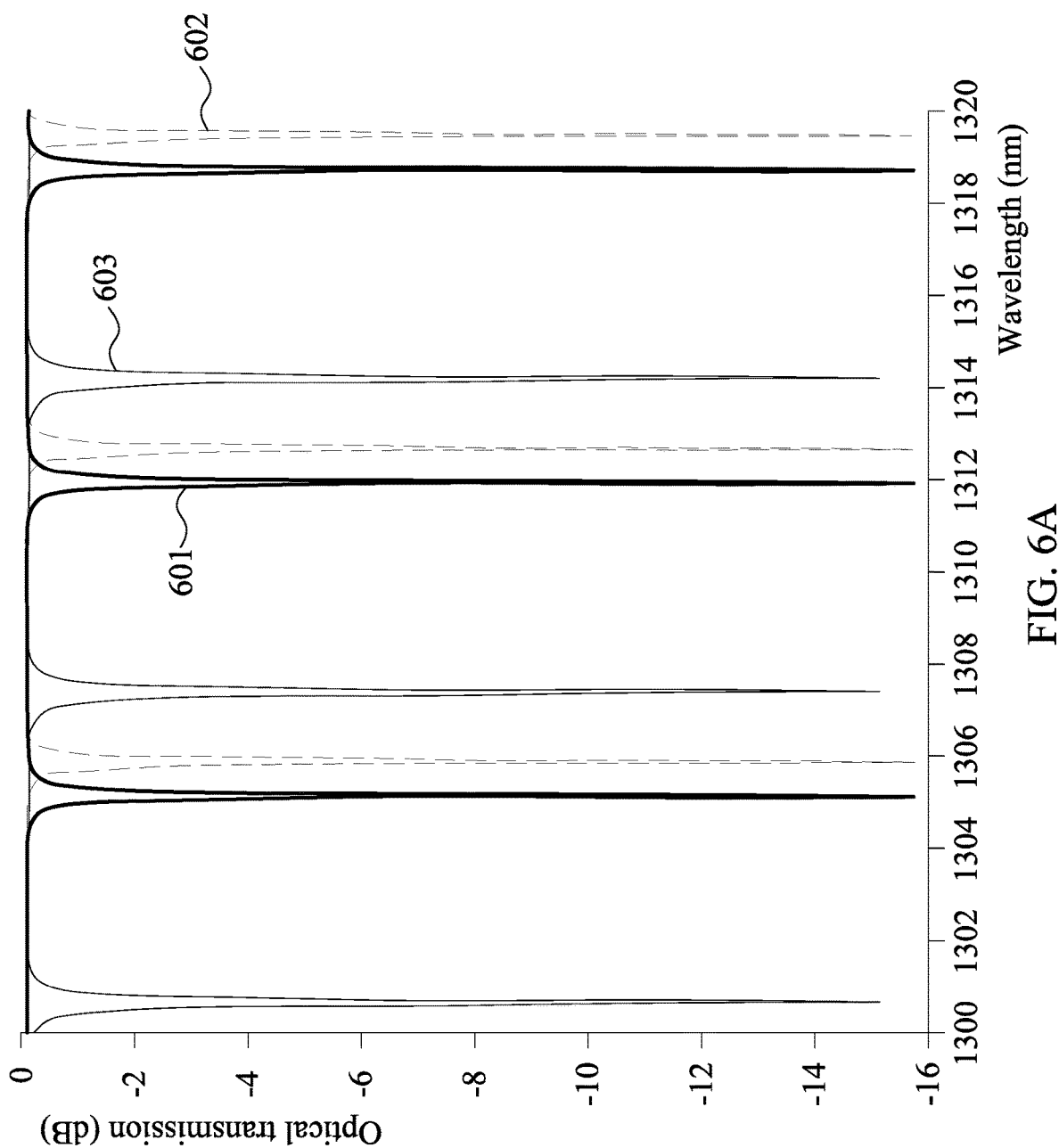
FIG. 6A is a graph illustrating optical transmission versus wavelength of the optical signal of an optical modulator, in accordance with some embodiments.

FIG. 6A is a graph illustrating optical transmission versus wavelength of the optical signal of an optical modulator, in accordance with some embodiments. FIG. 6A shows the shift of the resonant wavelength of the optical modulator with respect to temperature. Referring to FIG. 6A, the x-axis represents the wavelength (nm) of the optical signal coupled to the optical modulator. The y-axis represents the optical transmission (dB) of the optical signal. The line 601 represents resonance at a temperature of 300K, and line 602 represents resonance at a temperature of 310K, and the line 603 represents resonance at a temperature of 320K.

According to the line 601, the modulator may have resonant wavelength about 1305 and 1312 nm, at which the peaks occur. According to the line 602, the modulator may have resonant wavelength of about 1306 and 1312.5 nm, at which the peaks occur. According to the line 603, the modulator may have resonant wavelength of about 1307.2, and 1314.1 nm, at which the peaks occur. Referring to FIG. 6A, the resonant wavelength of the modulator can be modulated to be increased with higher temperature.

Figure 6B:
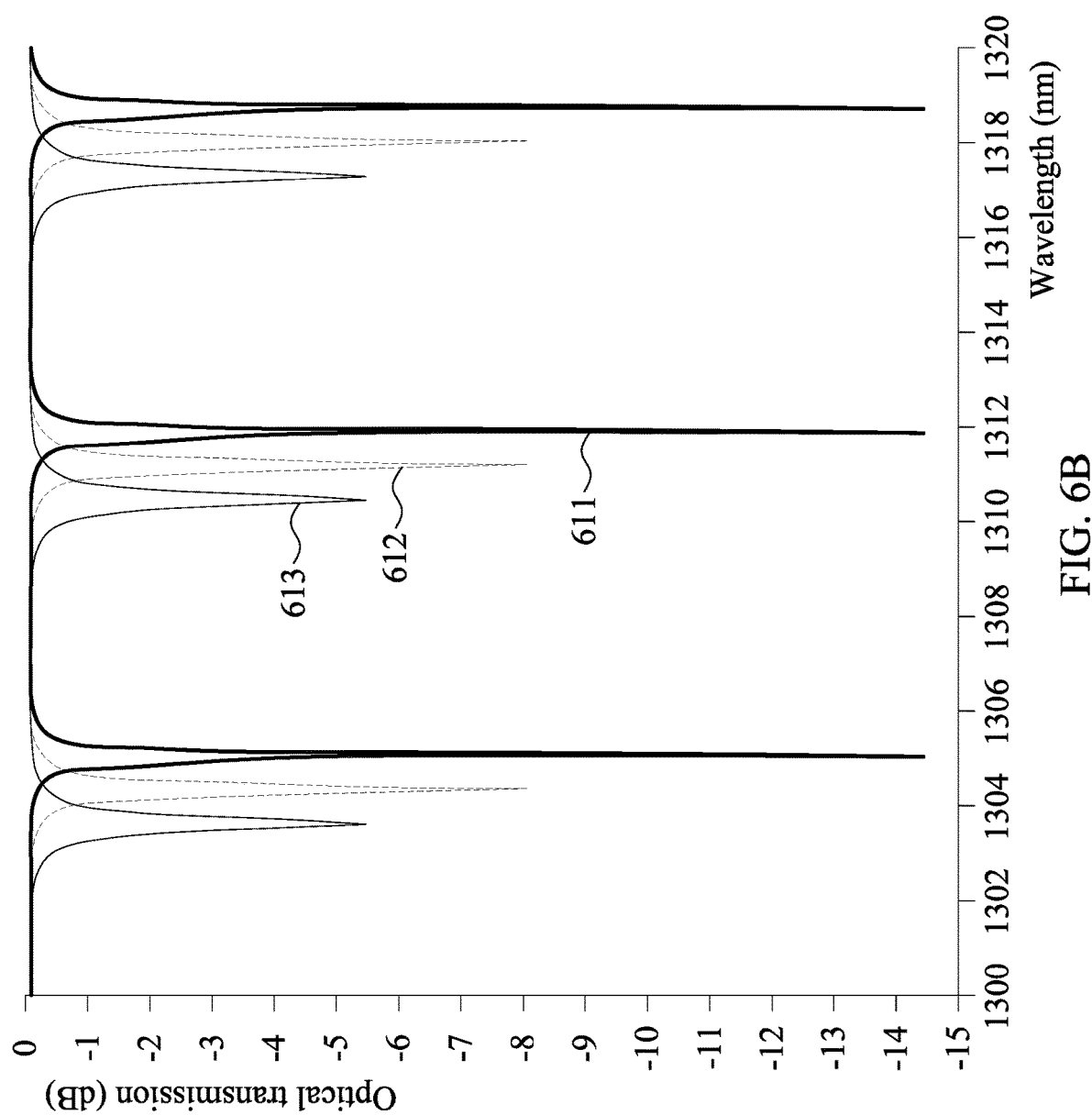
FIG. 6B is a graph illustrating optical transmission versus wavelength of the optical signal of an optical modulator, in accordance with some embodiments.

FIG. 6B is a graph illustrating optical transmission versus wavelength of the optical signal of an optical modulator, in accordance with some embodiments. FIG. 6B shows the shift of the resonant wavelength of the optical modulator with respect to the voltage applied on the low speed phase shifter in the modulator. In some embodiments, the low speed phase shifter can be a low speed PIN phase shifter (LSPIN). Referring to FIG. 6B, the x-axis represents the wavelength (nm) of the optical signal coupled to the optical modulator. The y-axis represents the optical transmission (dB) of the optical signal. The line 611 represents resonance when the LSPIN is configured to receive a voltage of 0V; the line 612 represents resonance when the LSPIN is configured to receive a voltage of 1V, and the line 613 represents resonance when the LSPIN is configured to receive a voltage of 2V.

According to the line 611, the modulator may have resonant wavelength of about 1305, 1312, and 1319 nm, at which the peaks occur. According to the line 612, the modulator may have resonant wavelength of about 1304.2, 1311, and 1318 nm, at which the peaks occur. According to the line 613, the modulator may have resonant wavelength of about 1303.2, 1310.2, and 1317.1 nm, at which the peaks occur. Referring to FIG. 6B, the resonant wavelength of the modulator can be modulated to be increased as increased voltage is applied on the LSPIN.

Figure 7:
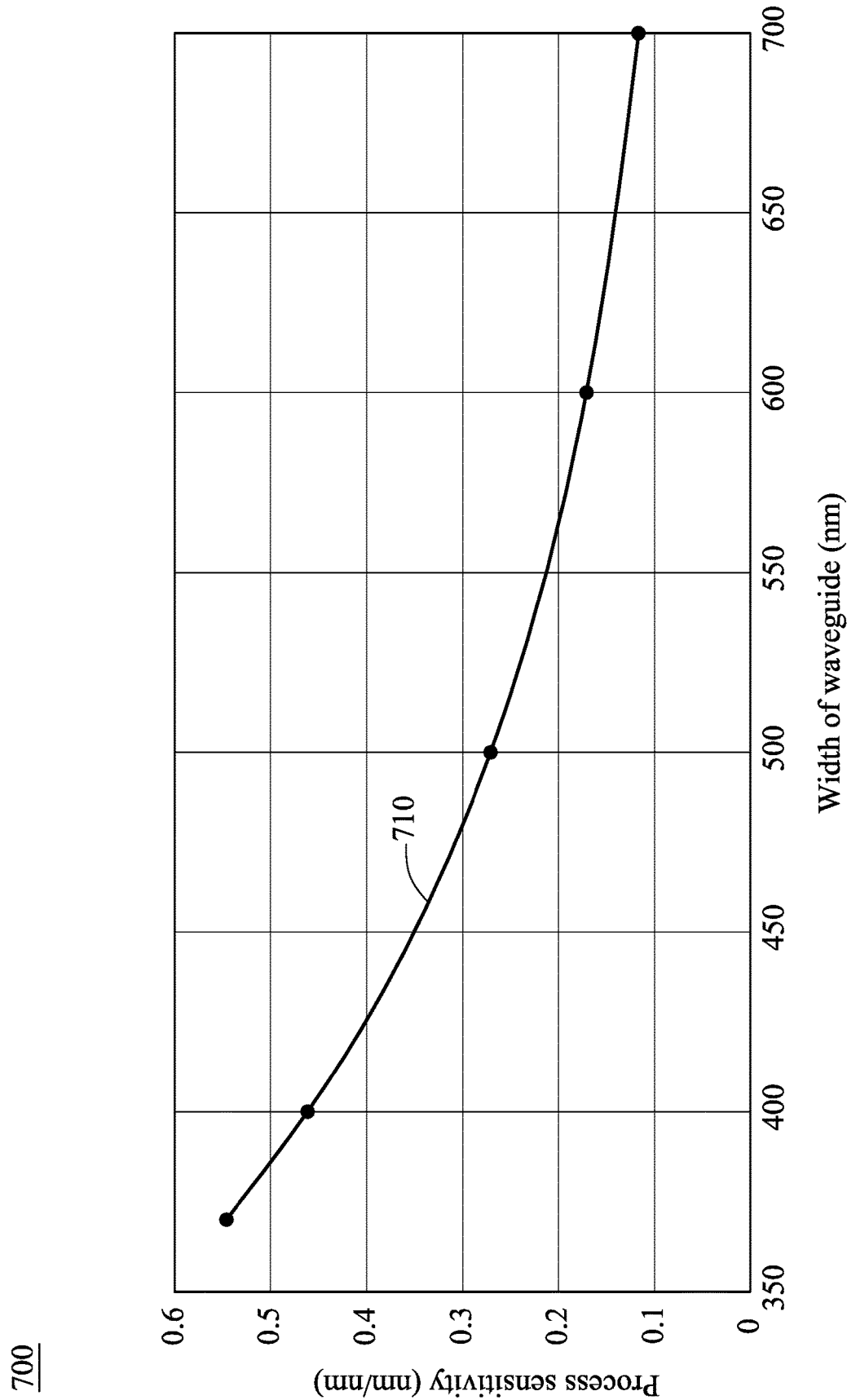
FIG. 7 is a graph illustrating process sensitivity versus width of the waveguide of an optical modulator, in accordance with some embodiments.

FIG. 7 is a graph illustrating process sensitivity versus width of the waveguide of an optical modulator, in accordance with some embodiments. Referring to FIG. 7, the x-axis represents the width (nm) of the waveguide of the optical modulator. The y-axis represents the process sensitivity (nm/nm) of the optical signal. The width of the waveguide can be the width W1 of the waveguide 210 as shown in FIG. 2A. The line 710 shows that the optical modulator process sensitivity improves with increased width of the waveguide of the optical modulator.

In some embodiments, when the width of the waveguide is 400 nm, the process sensitivity is about 0.46 nm/nm. When the width of the waveguide is 600 nm, the process sensitivity is about 0.18 nm/nm. Accordingly, at width of the waveguide of 600 nm, the modulator is less sensitive, and thus more stable.

Figure 8:
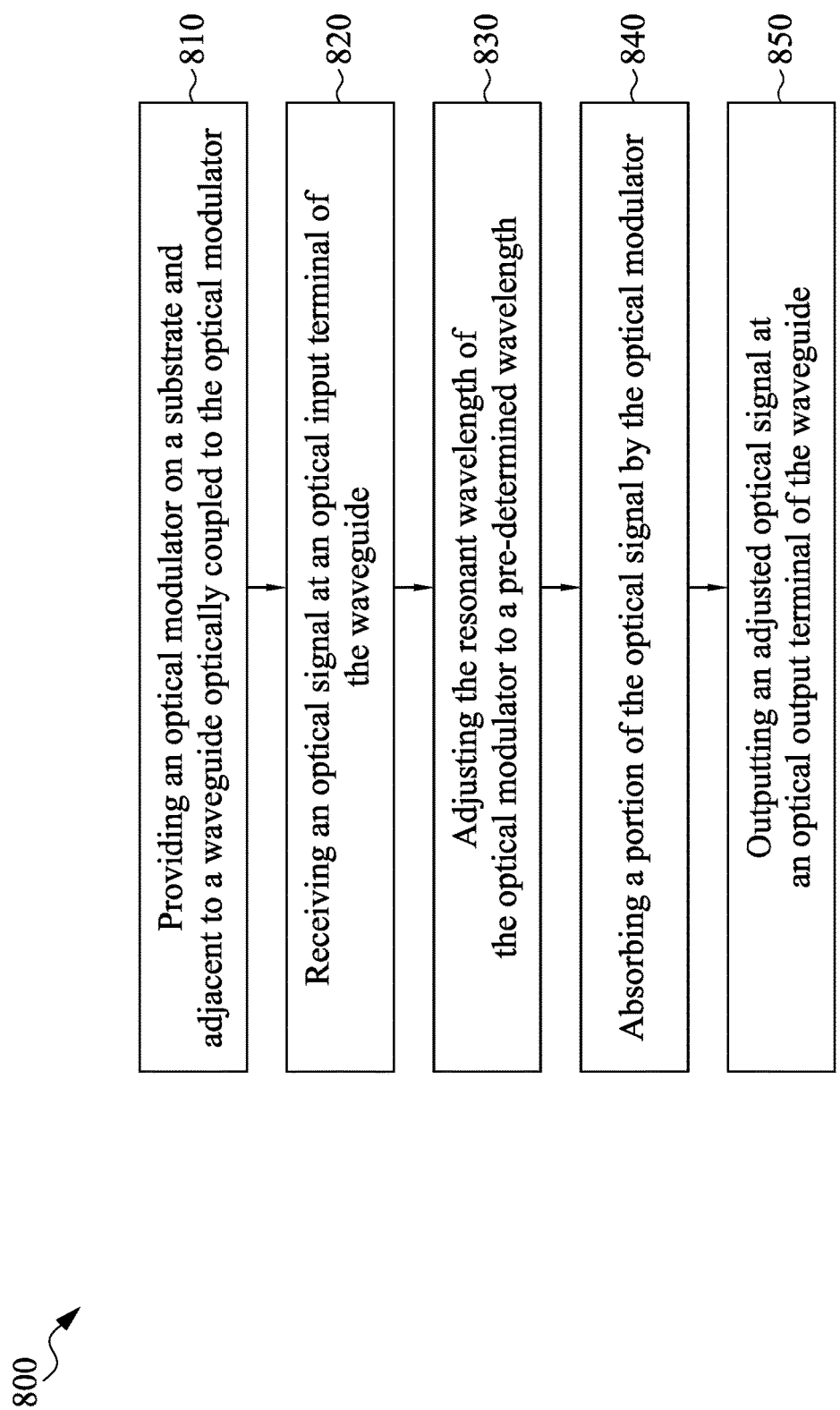
FIG. 8 is a flowchart showing a method for adjusting a resonant wavelength of an optical modulator, in accordance with some embodiments.

FIG. 8 is a flowchart 800 showing a method for adjusting a resonant wavelength of an optical modulator, in accordance with some embodiments of the present disclosure. In some embodiments, this method can be conducted by a semiconductor device. In some embodiments, this method can be conducted by a photonic circuit. In some embodiments, the method can be performed by the modulator shown in FIGS. 1B, 2A-2E, 3A-3B, 4A-4B, and 5A-5B.

In operation 810, the optical modulator is provided on a substrate and adjacent to a waveguide optically coupled to the optical modulator. In some embodiments, the waveguide includes an optical input terminal and an optical output terminal.

In operation 820, an optical signal can be received at the optical input terminal of the waveguide. In some embodiments, the optical signal can be transmitted through the waveguide.

In operation 830, the resonant wavelength of the optical modulator can be adjusted to a predetermined wavelength. The predetermined waveguide can be determined by the needs.

In operation 840, a portion of the optical signal can be absorbed by the optical modulator. When the wavelength of the portion of the optical signal corresponds to the resonant wavelength of the optical modulator, the portion of the optical signal can be optically coupled to the optical modulator.

In operation 850, an adjusted optical signal can be output at the optical output terminal of the waveguide. Since a portion of the optical signal is optically coupled to the optical modulator, the adjusted optical signal would lack such portion of optical signal. Therefore, the adjusted optical signal can be adjusted to be the desired signal (light) output at the optical output terminal of the waveguide.

According to some embodiments, a semiconductor device is provided. The semiconductor device includes a substrate, a first waveguide disposed on the substrate, and a second waveguide disposed on the substrate and spaced apart from the first waveguide with a first distance. In addition, the second waveguide includes a first electrical coupling portion having a first type doping, a second electrical coupling portion having a second type doping, and an optical coupling portion disposed between the first electrical coupling portion and the second electrical coupling portion, wherein the second waveguide is configured to receive a first voltage through the first electrical coupling portion and the second electrical coupling portion to decrease a resonant wavelength of the second waveguide.

According to other embodiments, a photonic circuit is provided. The photonic circuit includes a substrate, a first waveguide disposed on the substrate, and a second waveguide disposed on the substrate and separated apart from the first waveguide. In addition, the second waveguide includes an optical coupling portion, a first electrical coupling portion adjacent to the optical coupling region and having a first type doping, a second electrical coupling portion adjacent to the optical coupling region and having a second type doping. Wherein the optical coupling portion has a doping concentration less than that of the first electrical coupling portion and the second electrical coupling portion, and wherein the first electrical coupling portion of the second waveguide is configured to receive a first voltage to decrease a resonant wavelength of the second waveguide in nanometer level.

According to other embodiments, a method for adjusting a resonant wavelength of an optical modulator. The method includes providing the optical modulator on a substrate and adjacent to a waveguide optically coupled to the optical modulator, wherein the waveguide includes an optical input terminal and an optical output terminal; receiving an optical signal at the optical input terminal of the waveguide; adjusting the resonant wavelength of the optical modulator to a predetermined wavelength; absorbing a portion of the optical signal by the optical modulator; and outputting an adjusted optical signal at the optical output terminal of the waveguide.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A semiconductor device, comprising:
a substrate;
a first waveguide disposed on the substrate; and
an optical modulator disposed on the substrate and spaced apart from the first waveguide with a first distance, the optical modulator including:
a first electrical coupling portion having a first type doping;
a second electrical coupling portion having a second type doping; and
an optical coupling portion disposed between the first electrical coupling portion and the second electrical coupling portion, wherein the optical coupling portion includes an intrinsic semiconductor,
wherein the optical modulator is configured to receive a first voltage through the first electrical coupling portion and the second electrical coupling portion to decrease a resonant wavelength of the optical modulator.

2. The semiconductor device of claim 1, further comprising:
a dielectric layer disposed on the optical modulator; and
a heater disposed on the dielectric layer.

3. The semiconductor device of claim 2, wherein the heater is configured to increase the resonant wavelength of the optical modulator thermally.

4. The semiconductor device of claim 2, wherein the heater covers a portion of the optical modulator from a top view perspective.

5. The semiconductor device of claim 1, wherein the optical modulator is annular.

6. The semiconductor device of claim 5, wherein the first waveguide is curved, and a first curvature of the first waveguide is substantially conformed to a second curvature of a portion of the optical modulator.

7. The semiconductor device of claim 1, wherein the optical coupling portion of the optical modulator has a width in a range of 0.01 to 10 μm.

8. The semiconductor device of claim 1, wherein the first electrical coupling portion includes:
a first region adjacent to the optical coupling region; and
a second region adjacent to the first region of the first electrical coupling portion,
wherein the second region has a height greater than a height of the first region.

9. The semiconductor device of claim 8, wherein the first region of the first electrical coupling portion has a first doping concentration, and the second region of the first electrical coupling portion has a second doping concentration greater than the first doping concentration.

10. The semiconductor device of claim 8, wherein the second electrical coupling portion includes:
a third region adjacent to the optical coupling region; and
a fourth region adjacent to the third region of the second electrical coupling portion,
wherein the fourth region has a height greater than a height of the third region.

11. The semiconductor device of claim 10, wherein the third region of the second electrical coupling portion has a third doping concentration, and the fourth region of the second electrical coupling portion has a fourth doping concentration greater than the third doping concentration.

12. The semiconductor device of claim 1, wherein the optical coupling portion includes:
a fifth region adjacent to the first electrical coupling portion, wherein the fifth region has the first type doping; and
a sixth region adjacent to the second electrical coupling portion and the fifth region, wherein the sixth region has the second type doping.

13. A photonic circuit, comprising:
a substrate;
a first waveguide disposed on the substrate; and
an optical modulator disposed on the substrate, and separated apart from the first waveguide, the optical modulator including:
an optical coupling portion including a first portion undoped and a second portion doped;
a first electrical coupling portion adjacent to the optical coupling region, and having a first type doping; and
a second electrical coupling portion adjacent to the optical coupling region, and having a second type doping,
wherein the second portion of the optical coupling portion has a doping concentration less than that of the first electrical coupling portion and the second electrical coupling portion, and wherein the first electrical coupling portion of the optical modulator is configured to receive a first voltage to decrease a resonant wavelength of the optical modulator in nanometer level.

14. The photonic circuit of claim 13, further comprising:
a dielectric layer disposed on the optical modulator; and
a heater disposed on the dielectric layer.

15. The photonic circuit of claim 14, wherein the heater covers a portion of the optical modulator from a top view perspective.

16. The photonic circuit of claim 13, wherein the optical modulator is in a form of ring.

17. The photonic circuit of claim 16, wherein the first waveguide is curved, and a first curvature of the first waveguide is substantially conformed to a second curvature of a portion of the optical modulator.

18. A photonic circuit, comprising:
a waveguide;
an optical modulator disposed adjacent to and optically coupled to the waveguide, the optical modulator comprising:
an optical coupling portion including an intrinsic semiconductor;
a first electrical coupling portion adjacent to the optical coupling region, and having a first type doping; and
a second electrical coupling portion adjacent to the optical coupling region, and
having a second type doping; and
a heater disposed on the optical modulator,
wherein the optical modulator is configured to receive a first voltage through the first electrical coupling portion and the second electrical coupling portion to decrease a resonant wavelength of the optical modulator, and wherein the heater is configured to increase the resonant wavelength of the optical modulator thermally.

19. The photonic circuit of claim 18, wherein the optical coupling portion has a doping concentration less than that of the first electrical coupling portion and the second electrical coupling portion.

20. The photonic circuit of claim 18, wherein the waveguide is curved, and a first curvature of the waveguide is substantially conformed to a second curvature of a portion of the optical modulator.

\* \* \* \* \*